United States Patent
Ihara

(10) Patent No.: US 12,511,756 B2
(45) Date of Patent: Dec. 30, 2025

(54) IMAGE PROCESSING APPARATUS, OPERATION METHOD OF IMAGE PROCESSING APPARATUS, OPERATION PROGRAM OF IMAGE PROCESSING APPARATUS, AND LEARNING METHOD

(71) Applicant: FUJIFILM Corporation, Tokyo (JP)

(72) Inventor: Satoshi Ihara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 228 days.

(21) Appl. No.: 18/453,319

(22) Filed: Aug. 22, 2023

(65) Prior Publication Data
US 2023/0394673 A1  Dec. 7, 2023

Related U.S. Application Data

(63) Continuation of application No. PCT/JP2021/045209, filed on Dec. 8, 2021.

(30) Foreign Application Priority Data

Mar. 3, 2021 (JP) .................................. 2021-033848

(51) Int. Cl.
*G06T 7/12* (2017.01)
*G06T 5/30* (2006.01)
(Continued)

(52) U.S. Cl.
CPC .................. *G06T 7/12* (2017.01); *G06T 5/30* (2013.01); *G06T 7/13* (2017.01); *G06V 10/44* (2022.01);
(Continued)

(58) Field of Classification Search
CPC ................................ A61B 6/03; G06N 20/00; G06T 2207/10116; G06T 2207/20084;
(Continued)

(56) References Cited

U.S. PATENT DOCUMENTS

2007/0230773 A1 10/2007 Nagao et al.
2019/0005660 A1 1/2019 Kinoshita et al.
(Continued)

FOREIGN PATENT DOCUMENTS

CN 109712163 5/2019
JP H08289888 11/1996
(Continued)

OTHER PUBLICATIONS

"International Search Report (Form PCT/ISA/210) of PCT/JP2021/045209", mailed on Feb. 22, 2022, with English translation thereof, pp. 1-7.
(Continued)

*Primary Examiner* — Manuchehr Rahmjoo
(74) *Attorney, Agent, or Firm* — JCIPRNET

(57) ABSTRACT

A processor uses a semantic segmentation model that has been trained using an annotation image in which a first pixel corresponding to at least any one of one point corresponding to an object, a plurality of discrete points corresponding to a plurality of objects, or a line corresponding to an object having a line structure is set as a first pixel value and a second pixel other than the first pixel is set as a second pixel value different from the first pixel value, the model having been trained by assigning a greater weight to the first pixel than to the second pixel to calculate a loss, inputs an image to the model and outputs a feature amount map having a feature amount related to the one point, etc. in the image from the model, and identifies the one point, etc. in the image based on the map.

8 Claims, 30 Drawing Sheets

(51) Int. Cl.
*G06T 7/13* (2017.01)
*G06V 10/44* (2022.01)
*G06V 10/764* (2022.01)

(52) U.S. Cl.
CPC ........ *G06V 10/764* (2022.01); *G06V 2201/03* (2022.01)

(58) Field of Classification Search
CPC ... G06T 2207/30012; G06T 5/30; G06T 7/00; G06T 7/12; G06T 7/13; G06V 10/26; G06V 10/44; G06V 10/454; G06V 10/764; G06V 10/82; G06V 2201/03
See application file for complete search history.

(56) References Cited

U.S. PATENT DOCUMENTS

| | | | |
|---|---|---|---|
| 2020/0069243 A1 | 3/2020 | Matsumoto et al. | |
| 2020/0272835 A1 | 8/2020 | Cheng et al. | |
| 2020/0395117 A1* | 12/2020 | Schnorr | G06N 3/088 |
| 2021/0133979 A1 | 5/2021 | Takahashi | |
| 2021/0224590 A1 | 7/2021 | Matsumoto et al. | |
| 2022/0028072 A1 | 1/2022 | Kondo et al. | |

FOREIGN PATENT DOCUMENTS

| | | |
|---|---|---|
| JP | 2005327076 | 11/2005 |
| JP | 2019013724 | 1/2019 |
| JP | 2019175093 | 10/2019 |
| JP | 2020025730 | 2/2020 |
| JP | 2021503414 | 2/2021 |
| WO | 2017141958 | 8/2017 |
| WO | 2019235192 | 12/2019 |
| WO | 2020235461 | 11/2020 |

OTHER PUBLICATIONS

"Written Opinion of the International Searching Authority (Form PCT/ISA/237) of PCT/JP2021/045209", mailed on Feb. 22, 2022, with English translation thereof, pp. 1-10.

Sheng Lu et al., "Dynamic Weighted Cross Entropy for Semantic Segmentation with Extremely Imbalanced Data," 2019 International Conference on Artificial Intelligence and Advanced Manufacturing (AIAM), Oct. 2019, pp. 230-233.

Ryosuke Kubota et al., "Contour Extraction of Transparent Objects Using Fully Convolutional Networks," IEICE Technical Report, vol. 118, May 2018, with English translation thereof, pp. 1-19.

Patrik Olã Bressan et al., "Semantic Segmentation with Labeling Uncertainty and Class Imbalance," arXiv:2102.04566v1, Feb. 2021, pp. 1-15, available at: https://arxiv.org/pdf/2102.04566.pdf.

"Office Action of Japan Counterpart Application", issued on Sep. 9, 2025, with English translation thereof, p. 1- p. 6.

* cited by examiner (PRESENCE PROBABILITY, NON-PRESENCE PROBABILITY)

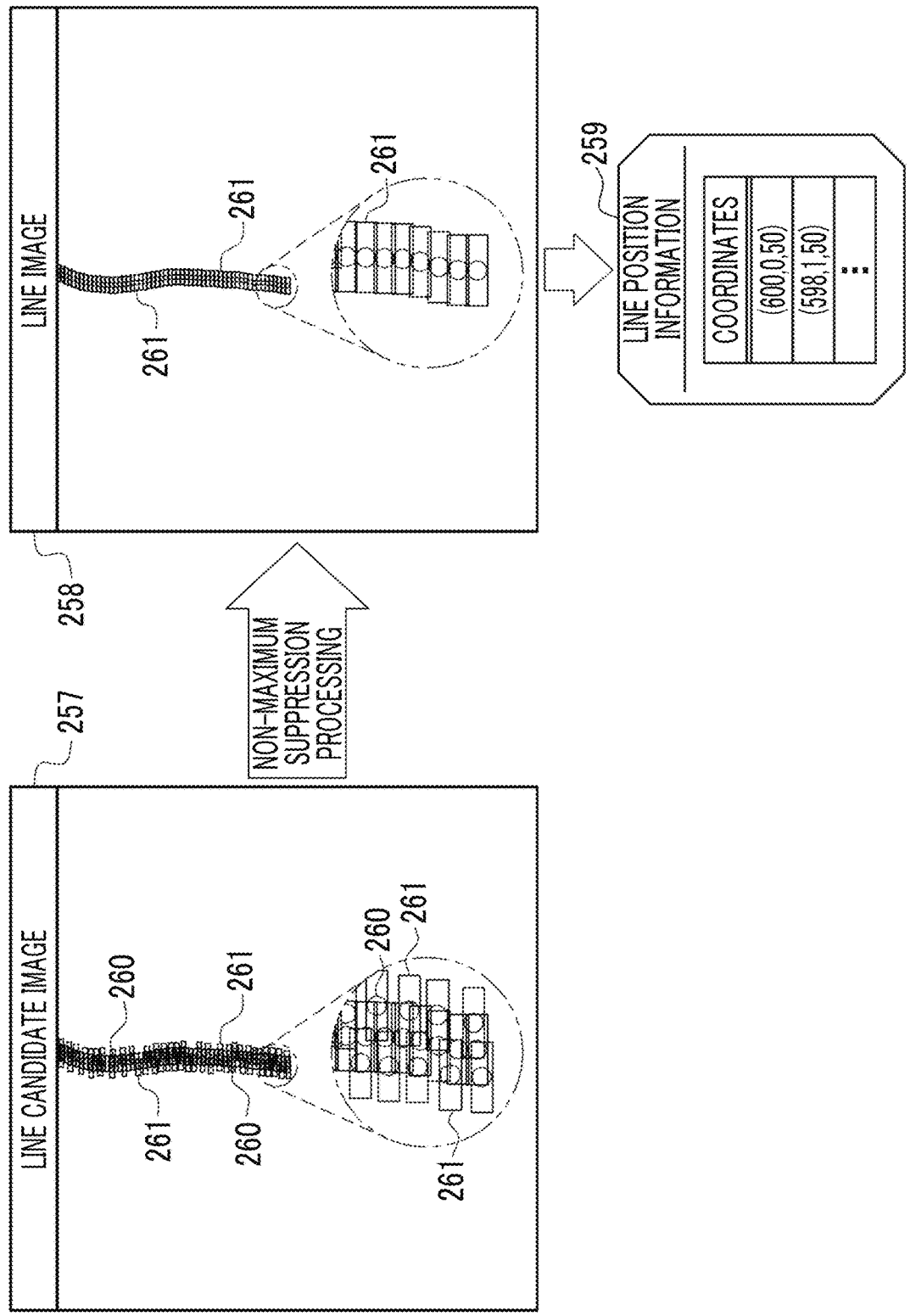

IMAGE PROCESSING APPARATUS, OPERATION METHOD OF IMAGE PROCESSING APPARATUS, OPERATION PROGRAM OF IMAGE PROCESSING APPARATUS, AND LEARNING METHOD

CROSS-REFERENCE TO RELATED APPLICATIONS

This application is a continuation application of International Application No. PCT/JP2021/045209 filed on Dec. 8, 2021, the disclosure of which is incorporated herein by reference in its entirety. Further, this application claims priority from Japanese Patent Application No. 2021-033848 filed on Mar. 3, 2021, the disclosure of which is incorporated herein by reference in its entirety.

BACKGROUND

1. Technical Field

The technology of the present disclosure relates to an image processing apparatus, an operation method of an image processing apparatus, an operation program of an image processing apparatus, and a learning method.

2. Description of the Related Art

As a machine learning model handling an image, a convolutional neural network (hereinafter, abbreviated as CNN) that performs semantic segmentation for identifying an object appearing in an analysis target image in units of pixels is known. For example, JP2020-025730A describes that a radiation image obtained by irradiating a patient with radiation is used as an analysis target image and a plurality of objects appearing in the radiation image are identified using a CNN. Examples of the object include a lung field, a spine (backbone), and other areas, and it is also described that a thoracic vertebra and a lumbar vertebra of the spine are separately identified.

SUMMARY

In the semantic segmentation by the CNN, the object having a certain size such as the lung field or the spine can be identified with relatively high accuracy. However, it is not possible to accurately identify a minute object such as a center point of a vertebral body of a vertebra, center points of right and left eyeballs, or a center line of an aorta.

One embodiment according to the technology of the present disclosure provides an image processing apparatus, an operation method of an image processing apparatus, an operation program of an image processing apparatus, and a learning method that can accurately identify a minute object.

The present disclosure relates to an image processing apparatus comprising a processor, and a memory connected to or built in the processor, in which the processor uses a semantic segmentation model that has been trained using an annotation image in which a first pixel corresponding to at least any one of one point corresponding to an object, a plurality of discrete points corresponding to a plurality of objects, or a line corresponding to an object having a line structure is set as a first pixel value and a second pixel other than the first pixel is set as a second pixel value different from the first pixel value, the semantic segmentation model having been trained by assigning a greater weight to the first pixel than to the second pixel to calculate a loss, inputs an analysis target image to the semantic segmentation model and outputs a feature amount map having a feature amount related to at least any one of the one point, the plurality of discrete points, or the line in the analysis target image from the semantic segmentation model, and identifies at least any one of the one point, the plurality of discrete points, or the line in the analysis target image based on the feature amount map.

It is preferable that the processor identifies a centroid of the feature amount map based on the feature amount as the one point.

It is preferable that the feature amount map is a probability distribution map having a presence probability of the plurality of discrete points as the feature amount, and the processor generates an output image in which each pixel is labeled with a class corresponding to the presence probability in the probability distribution map, and identifies the plurality of discrete points based on the output image.

It is preferable that the feature amount map is a probability distribution map having a presence probability of the plurality of discrete points as the feature amount, and the processor selects an element having the presence probability equal to or greater than a preset threshold value from among elements of the probability distribution map as a candidate for the plurality of discrete points, assigns a rectangular frame having a preset size to the selected candidate, performs non-maximum suppression processing on the rectangular frame, and identifies the plurality of discrete points based on a result of the non-maximum suppression processing.

It is preferable that the feature amount map is a probability distribution map having a presence probability of the line as the feature amount, and the processor generates an output image in which each pixel is labeled with a class corresponding to the presence probability in the probability distribution map, performs thinning processing on the output image, and identifies the line based on a result of the thinning processing.

It is preferable that the feature amount map is a probability distribution map having a presence probability of the line as the feature amount, and the processor selects an element having the presence probability equal to or greater than a preset threshold value from among elements of the probability distribution map as a candidate for the line, assigns a rectangular frame having a preset size to the selected candidate, performs non-maximum suppression processing on the rectangular frame, and identifies the line based on a result of the non-maximum suppression processing.

It is preferable that the analysis target image is a medical image in which an inside of a body of a patient appears, and the object is a structure of the body.

The present disclosure relates to an operation method of an image processing apparatus, the method comprising using a semantic segmentation model that has been trained using an annotation image in which a first pixel corresponding to at least any one of one point corresponding to an object, a plurality of discrete points corresponding to a plurality of objects, or a line corresponding to an object having a line structure is set as a first pixel value and a second pixel other than the first pixel is set as a second pixel value different from the first pixel value, the semantic segmentation model having been trained by assigning a greater weight to the first pixel than to the second pixel to calculate a loss, inputting an analysis target image to the semantic segmentation model and outputting a feature amount map having a feature amount related to at least any one of the one point, the plurality of discrete points, or the line in the analysis target image from the semantic segmentation model, and identifying at least any one of the one point, the plurality of discrete points, or the line in the analysis target image based on the feature amount map.

The present disclosure relates to an operation program of an image processing apparatus, the program causing a computer to execute a process comprising using a semantic segmentation model that has been trained using an annotation image in which a first pixel corresponding to at least any one of one point corresponding to an object, a plurality of discrete points corresponding to a plurality of objects, or a line corresponding to an object having a line structure is set as a first pixel value and a second pixel other than the first pixel is set as a second pixel value different from the first pixel value, the semantic segmentation model having been trained by assigning a greater weight to the first pixel than to the second pixel to calculate a loss, inputting an analysis target image to the semantic segmentation model and outputting a feature amount map having a feature amount related to at least any one of the one point, the plurality of discrete points, or the line in the analysis target image from the semantic segmentation model, and identifying at least any one of the one point, the plurality of discrete points, or the line in the analysis target image based on the feature amount map.

The present disclosure relates to a learning method of training a semantic segmentation model that outputs a feature amount map having a feature amount related to at least any one of one point corresponding to an object, a plurality of discrete points corresponding to a plurality of objects, or a line corresponding to an object having a line structure in an analysis target image, the method comprising using an annotation image in which a first pixel corresponding to at least any one of the one point, the plurality of discrete points, or the line is set as a first pixel value and a second pixel other than the first pixel is set as a second pixel value different from the first pixel value, and assigning a greater weight to the first pixel than to the second pixel to calculate a loss.

According to the technology of the present disclosure, it is possible to provide the image processing apparatus, the operation method of the image processing apparatus, the operation program of the image processing apparatus, and the learning method that can accurately identify the minute object.

BRIEF DESCRIPTION OF THE DRAWINGS

Exemplary embodiments according to the technique of the present disclosure will be described in detail based on the following figures, wherein:

FIG. 35 is a diagram showing the non-maximum suppression processing and a state in which the line position information is generated based on a line image.

DETAILED DESCRIPTION

First Embodiment

Figure 1:
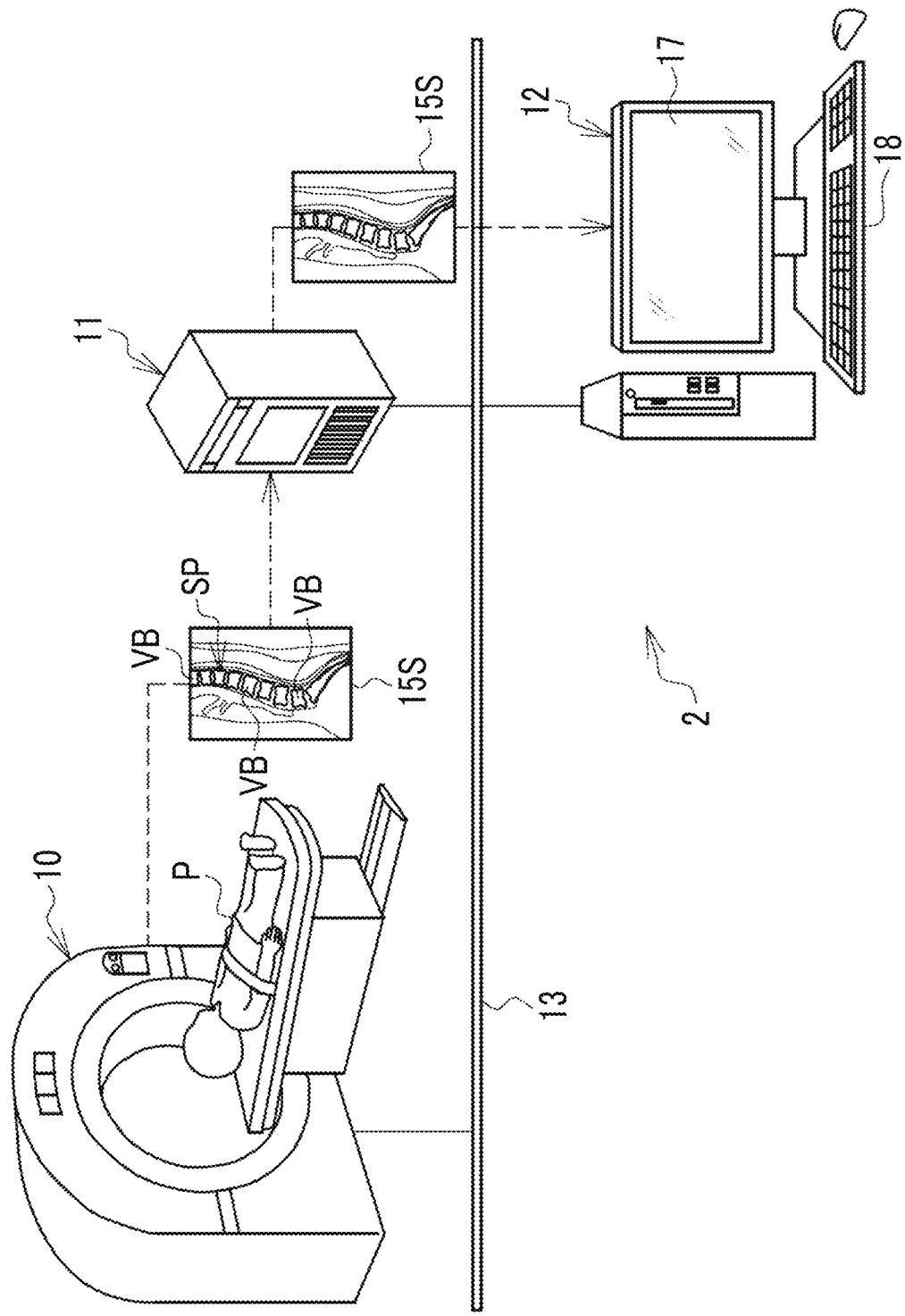
FIG. 1 is a diagram showing a medical system including a diagnosis support device.

For example, as shown in FIG. 1, a medical system 2 comprises a computed tomography (CT) apparatus 10, a picture archiving and communication system (PACS) server 11, and a diagnosis support device 12. The CT apparatus 10, the PACS server 11, and the diagnosis support device 12 are connected to a local area network (LAN) 13 installed in a medical facility, and can communicate with each other via the LAN 13.

As is well known, the CT apparatus 10 performs radiography on a patient P at different projection angles to acquire a plurality of pieces of projection data, and reconstructs the acquired plurality of pieces of projection data to output a tomographic image 15 of the patient P. The tomographic image 15 is voxel data indicating a three dimensional shape of an internal structure of the patient P. In the present example, the tomographic image 15 is an image (hereinafter, referred to as an upper part tomographic image) in which an upper body of the patient P appears. FIG. 1 shows an upper part tomographic image 15S of a sagittal cross section. A spine SP constituted by a plurality of vertebrae VB appears in the upper part tomographic image 15. The CT apparatus 10 transmits the upper part tomographic image 15 to the PACS server 11. The PACS server 11 stores and manages the upper part tomographic image 15 from the CT apparatus 10. The upper part tomographic image 15 is an example of an "analysis target image" and a "medical image" according to the technology of the present disclosure. In addition, the vertebra VB is an example of an "object" and a "structure" according to the technology of the present disclosure. The reconstruction of the projection data may be performed by the diagnosis support device 12 or the like instead of the CT apparatus 10.

The diagnosis support device 12 is, for example, a desktop personal computer, and is an example of an "image processing apparatus" according to the technology of the present disclosure. The diagnosis support device 12 comprises a display 17 and an input device 18. The input device 18 is, for example, a keyboard, a mouse, a touch panel, or a microphone. A doctor operates the input device 18 to transmit a distribution request for the upper part tomographic image 15 of the patient P to the PACS server 11. The PACS server 11 searches for the upper part tomographic image 15 of the patient P for which the distribution request is received, and distributes the upper part tomographic image 15 to the diagnosis support device 12. The diagnosis support device 12 displays the upper part tomographic image 15 distributed from the PACS server 11 on the display 17. The doctor observes the vertebra VB of the patient P appearing in the upper part tomographic image 15 to diagnose fracture, bone metastasis of cancer, and the like. In FIG. 1, only one CT apparatus 10 and one diagnosis support device 12 are shown, but a plurality of CT apparatuses 10 and a plurality of diagnosis support devices 12 may be provided.

Figure 2:
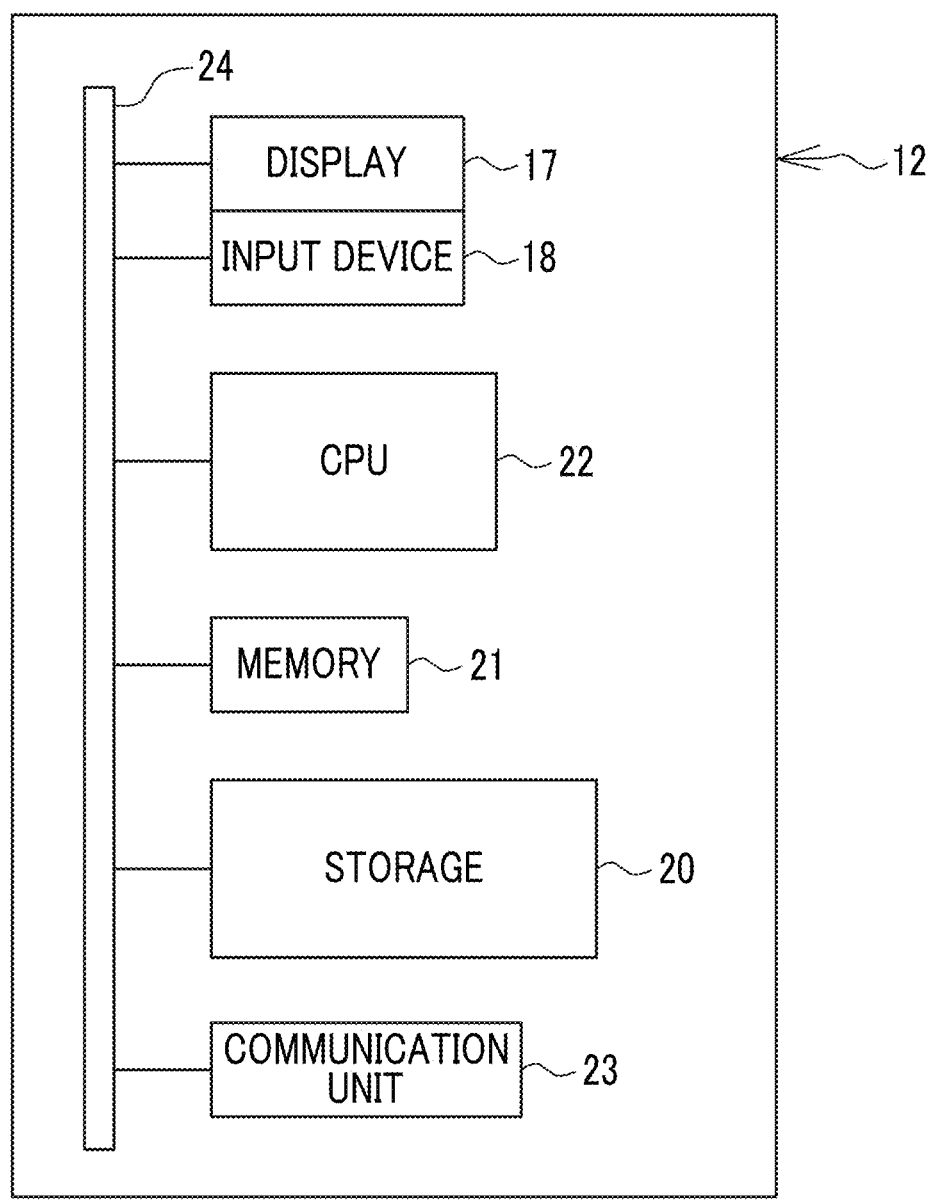
FIG. 2 is a block diagram showing a computer constituting the diagnosis support device.

As shown in FIG. 2 as an example, the computer constituting the diagnosis support device 12 comprises a storage 20, a memory 21, a central processing unit (CPU) 22, and a communication unit 23, in addition to the display 17 and the input device 18. These units are connected to each other through a busline 24. Note that CPU 22 is an example of a "processor" according to the technology of the present disclosure.

The storage 20 is a hard disk drive that is built in the computer constituting the diagnosis support device 12 or is connected to the computer through a cable or a network. Alternatively, the storage 20 is a disk array in which a plurality of hard disk drives are mounted. The storage 20 stores a control program such as an operating system, various application programs, various data associated with these programs, and the like. In addition, a solid state drive may be used instead of the hard disk drive.

The memory 21 is a work memory for the CPU 22 to execute processing. The CPU 22 loads the program stored in the storage 20 to the memory 21, and executes processing according to the program. Thus, the CPU 22 integrally controls the respective units of the computer. The communication unit 23 performs transmission control of various types of information with an external device such as the PACS server 11. The memory 21 may be built in the CPU 22.

Figure 3:
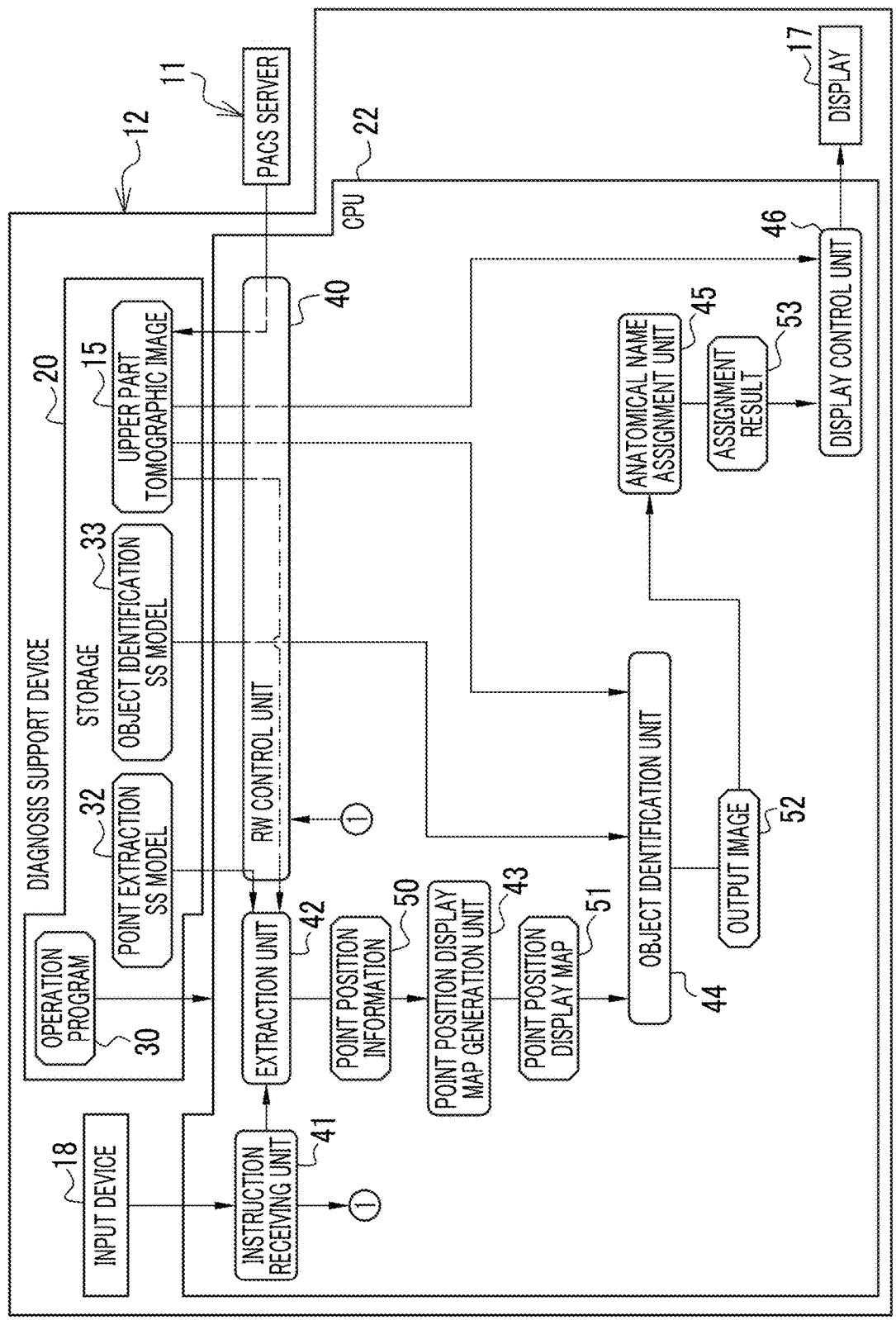
FIG. 3 is a block diagram showing a processing unit of a CPU of the diagnosis support device.

For example, as shown in FIG. 3, an operation program 30 is stored in the storage 20 of the diagnosis support device 12. The operation program 30 is an application program that causes the computer constituting the diagnosis support device 12 to function as an "image processing apparatus" according to the technology of the present disclosure. That is, the operation program 30 is an example of an "operation program of an image processing apparatus" according to the technology of the present disclosure. The storage 20 also stores the upper part tomographic image 15, a point extraction semantic segmentation (hereinafter, abbreviated as SS) model 32, and an object identification SS model 33. The point extraction SS model 32 is an example of a "semantic segmentation model" according to the technology of the present disclosure. In addition, for example, a doctor's opinion about the vertebra VB appearing in the upper part tomographic image 15 and data of various screens displayed on the display 17 are stored in the storage 20.

In a case where the operation program 30 is activated, the CPU 22 of the computer constituting the diagnosis support device 12 cooperates with the memory 21 or the like to function as a read/write (hereinafter, abbreviated as RW) control unit 40, an instruction receiving unit 41, an extraction unit 42, a point position display map generation unit 43, an object identification unit 44, an anatomical name assignment unit 45, and a display control unit 46.

The RW control unit 40 controls storage of various data in the storage 20 and reading out of various data in the storage 20. For example, the RW control unit 40 receives the upper part tomographic image 15 from the PACS server 11, and stores the received upper part tomographic image 15 in the storage 20. In FIG. 3, only one upper part tomographic image 15 is stored in the storage 20, but a plurality of upper part tomographic images 15 may be stored in the storage 20.

The RW control unit 40 reads out the upper part tomographic image 15 of the patient P designated by the doctor for diagnosis from the storage 20, and outputs the read out upper part tomographic image 15 to the extraction unit 42, the object identification unit 44, and the display control unit 46. Further, the RW control unit 40 reads out the point extraction SS model 32 from the storage 20, and outputs the read out point extraction SS model 32 to the extraction unit 42. Further, the RW control unit 40 reads out the object identification SS model 33 from the storage 20, and outputs the read out object identification SS model 33 to the object identification unit 44.

The instruction receiving unit 41 receives various instructions from the doctor through the input device 18. Examples of the instruction received by the instruction receiving unit 41 include an analysis instruction for the upper part tomographic image 15 and an opinion storage instruction for storing an opinion about the vertebra VB in the storage 20.

In a case where the analysis instruction is received, the instruction receiving unit 41 outputs the fact to the extraction unit 42. Further, in a case where the opinion storage instruction is received, the instruction receiving unit 41 outputs the fact as well as the opinion to the RW control unit 40.

The extraction unit 42 extracts a point in each vertebra VB appearing in the upper part tomographic image 15 by using the point extraction SS model 32. Here, it is assumed that a center point CP of a vertebral body (see FIG. 12 or the like) is extracted as the point in the vertebra VB. The extraction unit 42 generates point position information 50 indicating a position of the center point CP of the vertebral body. The extraction unit 42 outputs the point position information 50 to the point position display map generation unit 43. The center point CP of the vertebral body is an example of a "plurality of discrete points" according to the technology of the present disclosure.

The point position display map generation unit 43 generates a point position display map 51 representing the position of the center point CP of the vertebral body in the upper part tomographic image 15, based on the point position information 50 from the extraction unit 42. In the present example, the center point CP of the vertebral body is represented by one pixel 136 (see FIG. 16) in the upper part tomographic image 15. The point position display map generation unit 43 outputs the point position display map 51 to the object identification unit 44.

The object identification unit 44 identifies each vertebra VB based on the upper part tomographic image 15 and the point position display map 51. More specifically, the object identification unit 44 inputs the upper part tomographic image 15 and the point position display map 51 to the object identification SS model 33, and outputs an output image 52 (see also FIG. 17) in which each vertebra VB is identified, from the object identification SS model 33. The object identification unit 44 outputs the output image 52 to the anatomical name assignment unit 45.

The anatomical name assignment unit 45 assigns an anatomical name to each vertebra VB identified in the output image 52. The anatomical name assignment unit 45 outputs an assignment result 53, which is a result of the assignment of the anatomical name to the vertebra VB, to the display control unit 46.

The display control unit 46 controls display of various screens on the display 17. The various screens include a first screen 60 (see FIG. 4) for giving the analysis instruction for the upper part tomographic image 15 by the extraction unit 42, the point position display map generation unit 43, the object identification unit 44, and the anatomical name assignment unit 45, a second screen 155 (see FIG. 20) that displays the assignment result 53, and the like.

Figure 4:
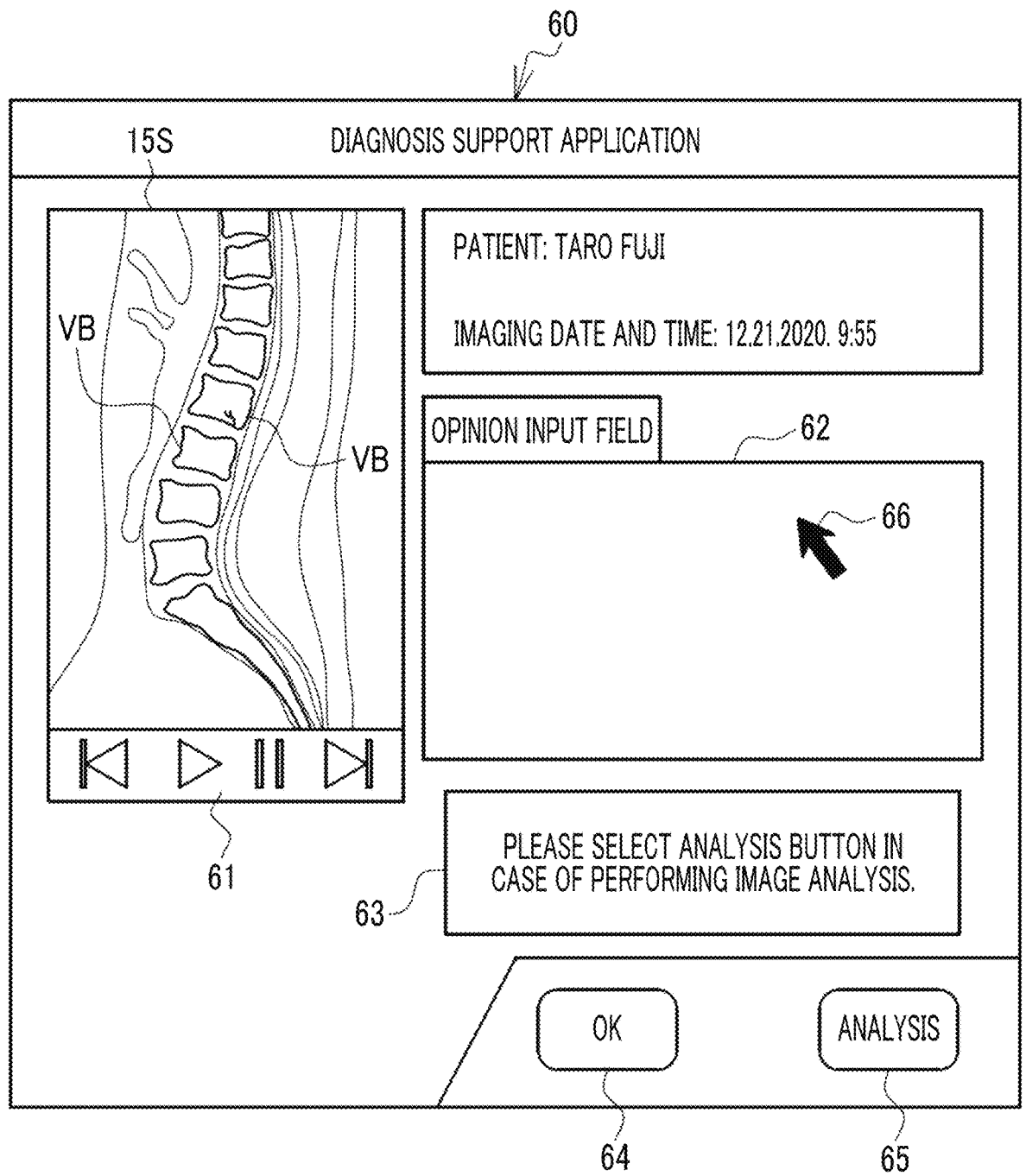
FIG. 4 is a diagram showing a first screen.

FIG. 4 shows an example of the first screen 60 for giving the analysis instruction for the upper part tomographic image 15. On the first screen 60, for example, the upper part tomographic image 15S of the sagittal cross section of the patient P whose spine SP is to be diagnosed is displayed. A button group 61 for switching the display is provided below the upper part tomographic image 15S. The upper part tomographic image 15 of an axial cross section and a coronal cross section may be displayed instead of or in addition to the upper part tomographic image 15S of the sagittal cross section.

An opinion input field 62, a message 63, an OK button 64, and an analysis button 65 are displayed on the first screen 60. The doctor inputs the opinion about the vertebra VB to the opinion input field 62. After inputting the opinion to the opinion input field 62, the doctor places a cursor 66 on the OK button 64 and selects the OK button 64. Then, the instruction receiving unit 41 receives the opinion storage instruction. The RW control unit 40 stores the upper part tomographic image 15 and the opinion input to the opinion input field 62 in the storage 20 in association with each other.

The message 63 is a content that prompts the selection of the analysis button 65. In a case where the doctor wants to analyze the upper part tomographic image 15 prior to the input of the opinion, the doctor places the cursor 66 on the analysis button 65 and selects the analysis button 65. Thus, the instruction receiving unit 41 receives the analysis instruction for the upper part tomographic image 15, and outputs the fact to the extraction unit 42.

Figure 5:
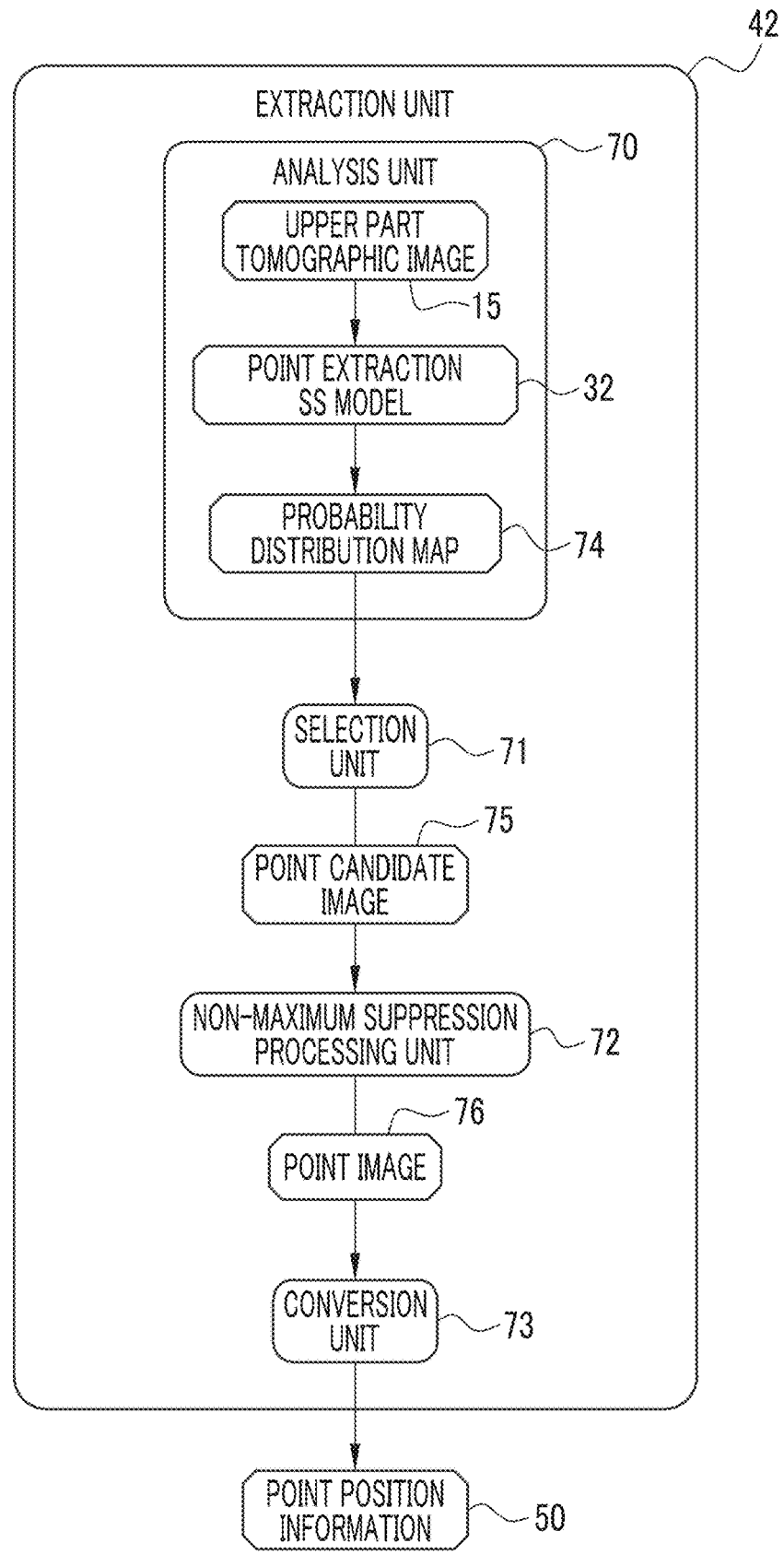
FIG. 5 is a diagram showing an extraction unit.

For example, as shown in FIG. 5, the extraction unit 42 includes an analysis unit 70, a selection unit 71, a non-maximum suppression processing unit 72, and a conversion unit 73. The analysis unit 70 inputs the upper part tomographic image 15 to the point extraction SS model 32, and outputs a probability distribution map 74 indicating a presence probability of the center point CP of the vertebral body from the point extraction SS model 32. The analysis unit 70 outputs the probability distribution map 74 to the selection unit 71.

Figure 6:
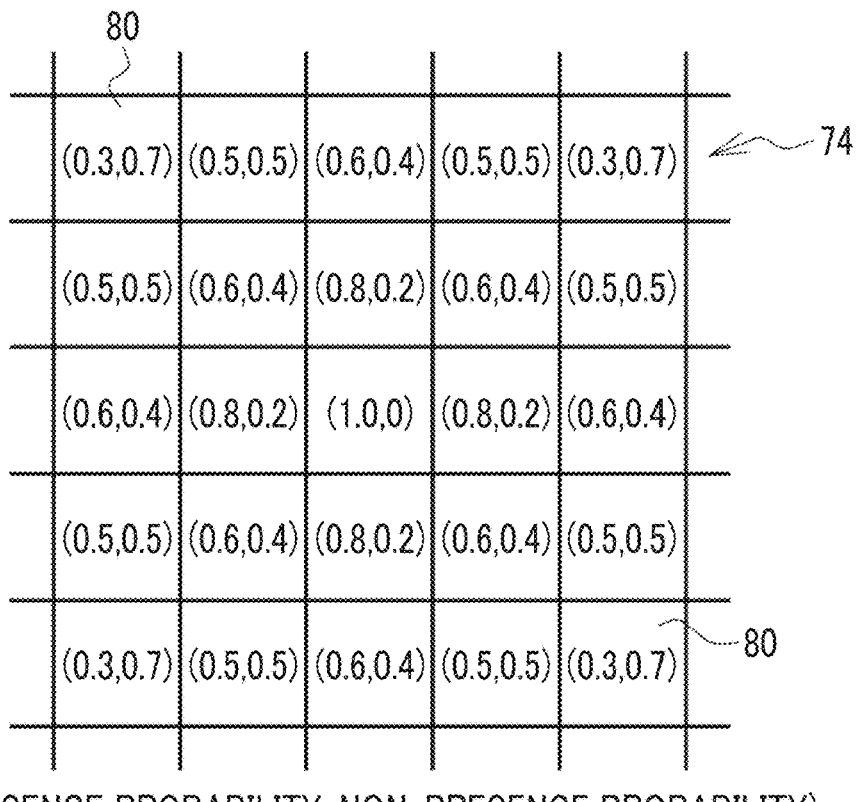
FIG. 6 is a diagram showing a probability distribution map.

As an example, as shown in FIG. 6, the probability distribution map 74 is data which has elements 80 corresponding to the pixels 136 of the upper part tomographic image 15 on a one-to-one basis, and in which a pair of the presence probability and a non-presence probability of the center point CP of the vertebral body is registered as an element value of each element 80. For example, the element values (1.0, 0) represent that the presence probability of the center point CP of the vertebral body is 100% and the non-presence probability thereof is 0%. The probability distribution map 74 is an example of a "feature amount map" according to the technology of the present disclosure. The element value of each element 80 of the probability distribution map 74 is an example of a "feature amount" according to the technology of the present disclosure.

Returning to FIG. 5, the selection unit 71 selects, as a candidate 120 (see FIG. 13) for the center point CP of the vertebral body, the element 80 in which the presence probability of the center point CP of the vertebral body is equal to or greater than a threshold value (for example, 0.9) in the probability distribution map 74. The selection unit 71 generates a point candidate image 75 (see also FIG. 13) representing the selected candidate 120, and outputs the generated point candidate image 75 to the non-maximum suppression processing unit 72. The point candidate image 75 is, for example, an image in which a pixel value of a pixel corresponding to the candidate 120 is 1 and pixel values of the other pixels are 0.

The non-maximum suppression processing unit 72 performs non-maximum suppression processing on each candidate 120 of the point candidate image 75, and as a result, generates a point image 76 (see also FIG. 13) representing the center point CP of the vertebral body. The point image 76 is, for example, an image in which a pixel value of a pixel corresponding to the center point CP of the vertebral body is 1 and pixel values of the other pixels are 0. That is, the point image 76 is an image in which the center point CP of the vertebral body is identified.

The non-maximum suppression processing unit 72 outputs the point image 76 to the conversion unit 73. The conversion unit 73 converts the point image 76 into the point position information 50.

Figure 7:
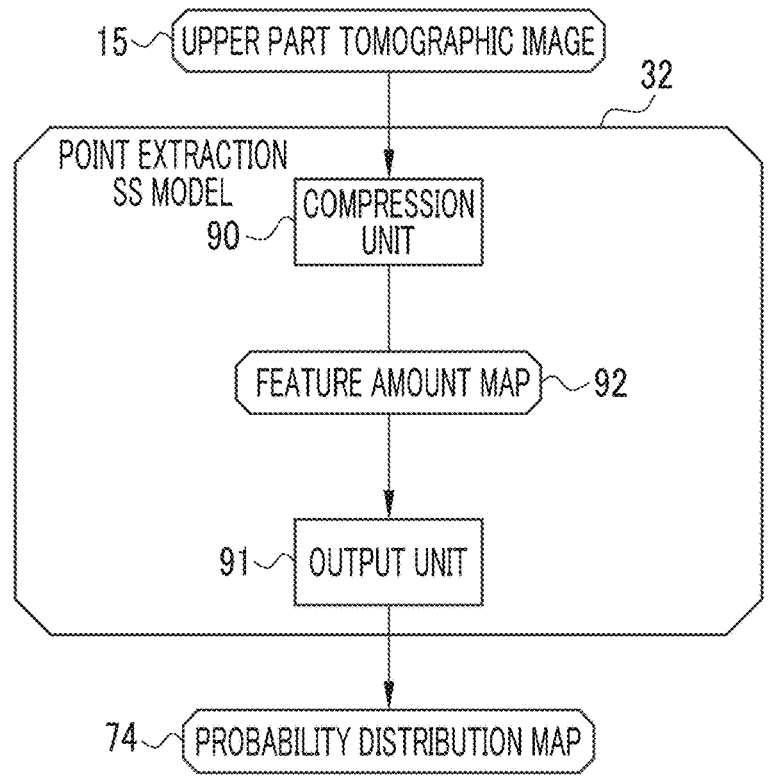
FIG. 7 is a diagram showing a point extraction semantic segmentation model.

As an example, as shown in FIG. 7, the point extraction SS model 32 includes a compression unit 90 and an output unit 91. The upper part tomographic image 15 is input to the compression unit 90. The upper part tomographic image 15 to be input to the compression unit 90 is, for example, the upper part tomographic image 15S of the sagittal cross section which is a source of the generation of the point position display map 51. The compression unit 90 converts the upper part tomographic image 15 into a feature amount map 92. The compression unit 90 delivers the feature amount map 92 to the output unit 91. The output unit 91 outputs the probability distribution map 74 based on the feature amount map 92.

Figure 8:
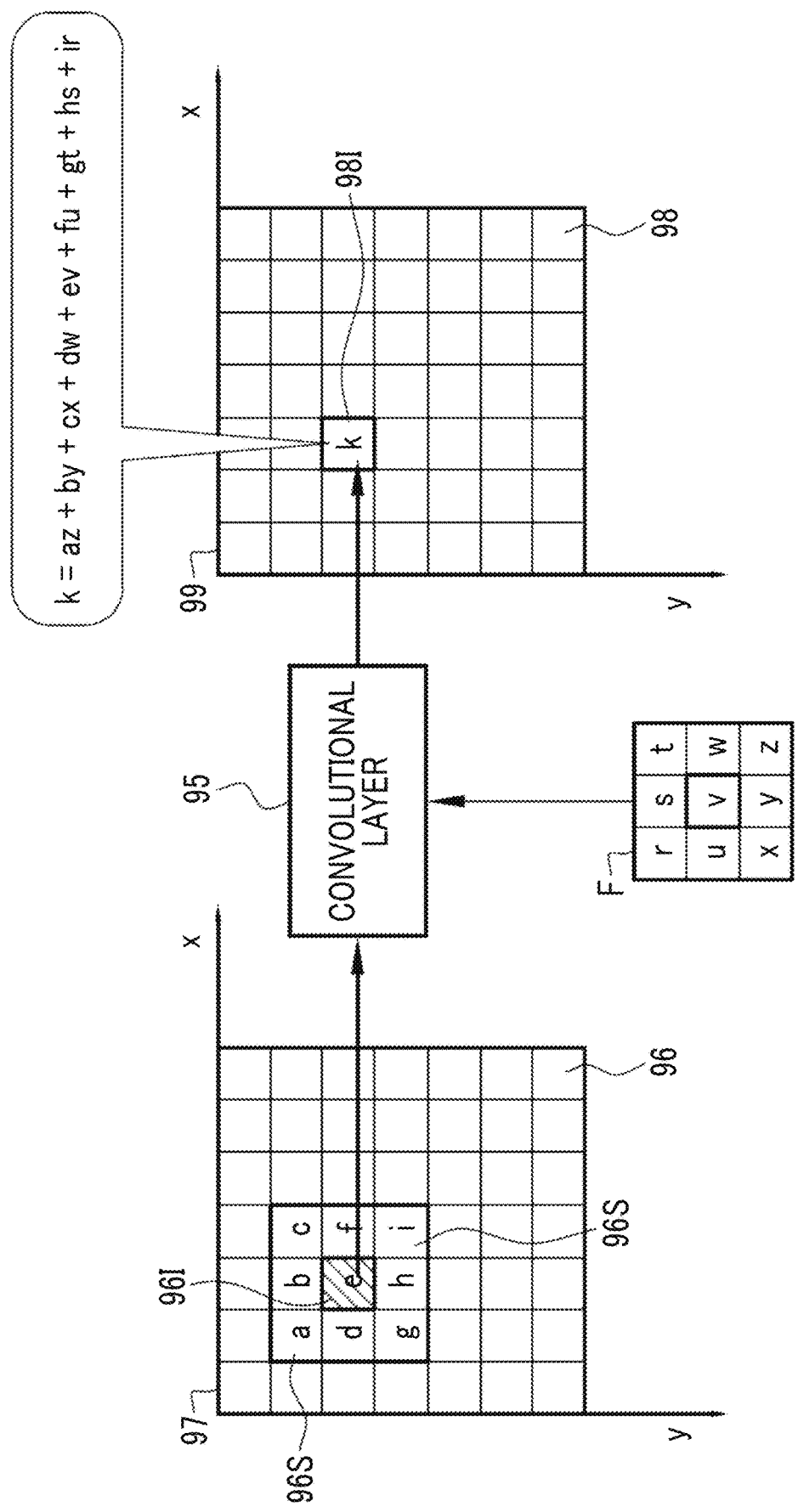
FIG. 8 is an explanatory diagram of convolution processing performed on target data.

For example, the compression unit 90 performs a convolution operation as shown in FIG. 8 to set the upper part tomographic image 15 as the feature amount map 92.

As an example, as shown in FIG. 8, the compression unit 90 has a convolutional layer 95. The convolutional layer 95 applies, for example, a 3×3 filter F to target data 97 having a plurality of elements 96 arranged two dimensionally. Then, an element value e of one element of interest 96I among the elements 96 and element values a, b, c, d, f, g, h, and i of eight elements 96S adjacent to the element of interest 96I are convoluted. The convolutional layer 95 sequentially performs the convolution operation on the respective elements 96 of the target data 97 while shifting the element of interest 96I by one element, and outputs an element value of an element 98 of operation data 99. As a result, the operation data 99 having a plurality of elements 98 arranged two dimensionally is obtained. The target data 97 to be input to the convolutional layer 95 is, for example, the upper part tomographic image 15 or reduction operation data 99S (see FIG. 10) described later.

In a case where coefficients of the filter F are set as r, s, t, u, v, w, x, y, and z, an element value k of an element 98I of the operation data 99, which is a result of the convolution operation with respect to the element of interest 96I, is obtained by, for example, calculating Expression (1).

$$k = az + by + cx + dw + ev + fu + gt + hs + ir \qquad (1)$$

Figure 9:
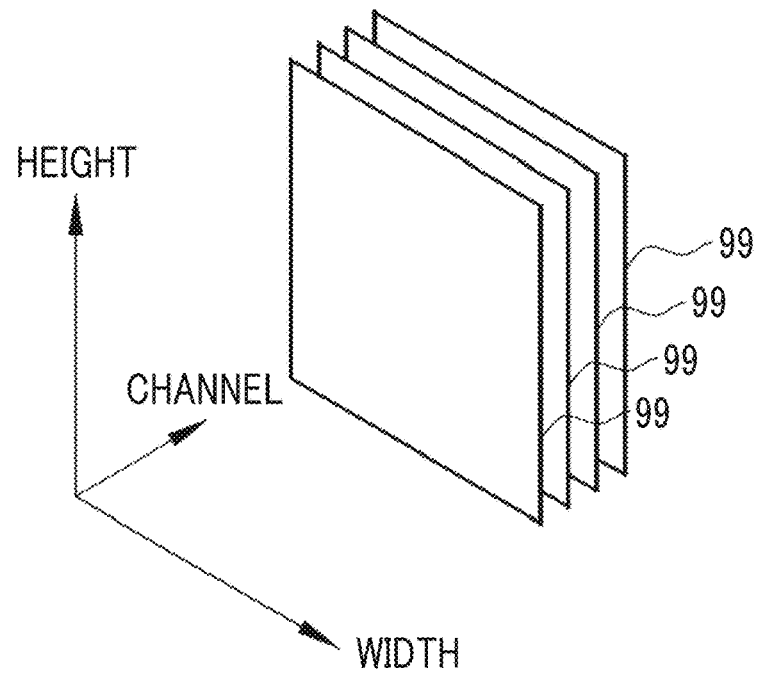
FIG. 9 is a diagram showing a configuration of operation data.

One operation data 99 is output to one filter F. In a case where a plurality of types of filters F are applied to one target data 97, the operation data 99 is output for each filter F. That is, as shown in FIG. 9 as an example, the operation data 99 is generated for the number of filters F applied to the target data 97. Since the operation data 99 has the plurality of elements 98 arranged two dimensionally, the operation data 99 has a width and a height. The number of operation data 99 is referred to as the number of channels. FIG. 9 shows, as an example, four channels of the operation data 99 output by applying four filters F to one target data 97.

Figure 10:
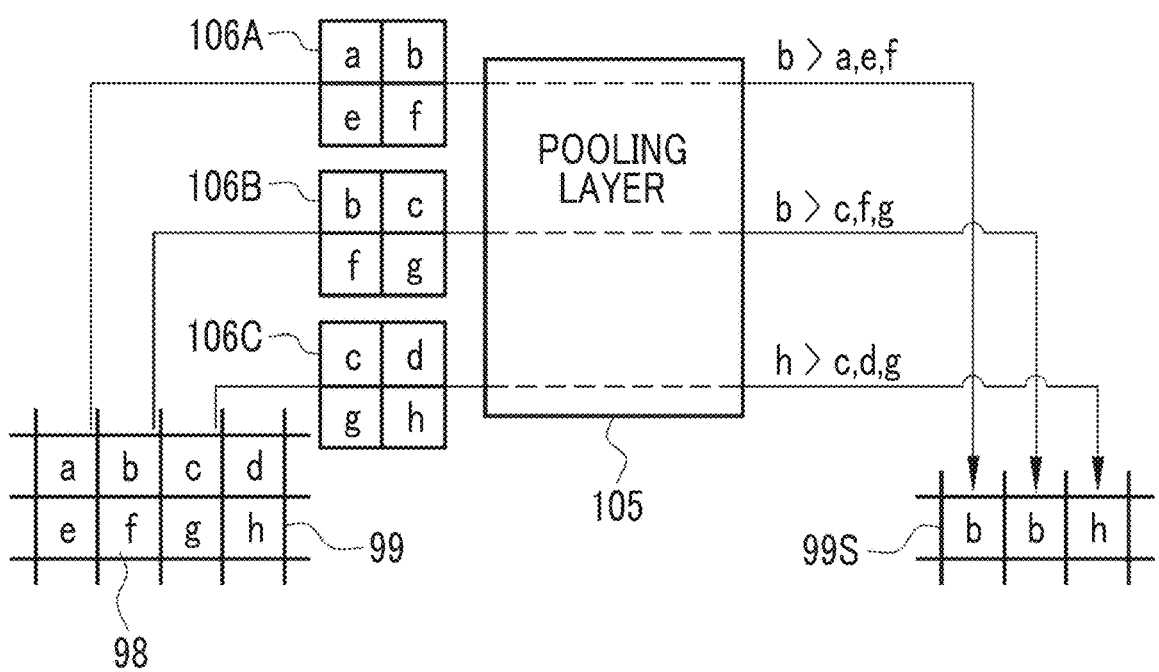
FIG. 10 is an explanatory diagram of pooling processing.

As an example, as shown in FIG. 10, the compression unit 90 has a pooling layer 105 in addition to the convolutional layer 95. The pooling layer 105 obtains a local statistic of the element value of the element 98 of the operation data 99, and generates the reduction operation data 99S having the obtained statistic as the element value. Here, the pooling layer 105 performs maximum value pooling processing of obtaining the maximum value of the element value in a block 106 of 2×2 elements as the local statistic. In a case where the processing is performed while shifting the block 106 in a width direction and a height direction by one element, the reduction operation data 99S is reduced to a size of ½ of original operation data 99. FIG. 10 shows, as an example, a case where b among the element values a, b, e, and f in a block 106A, b among the element values b, c, f, and g in a block 106B, and h among the element values c, d, g, and h in a block 106C are the maximum values, respectively. Average value pooling processing of obtaining an average value instead of the maximum value as the local statistic may be performed.

The compression unit 90 outputs final operation data 99 by repeating the convolution processing by the convolutional layer 95 and the pooling processing by the pooling layer 105 a plurality of times. The final operation data 99 is exactly the feature amount map 92. Although not shown, the compression unit 90 also performs skip layer processing or the like of delivering the operation data 99 to the output unit 91.

The output unit 91 performs upsampling processing of enlarging a size of the feature amount map 92 to obtain an enlarged feature amount map. The output unit 91 also performs convolution processing simultaneously with the upsampling processing. In addition, the output unit 91 performs merge processing of combining the enlarged feature amount map with the operation data 99 delivered from the compression unit 90 in the skip layer processing. The output unit 91 further performs the convolution processing after the merge processing. Through such various pieces of processing, the output unit 91 outputs the probability distribution map 74 from the feature amount map 92.

As described above, the point extraction SS model 32 is constructed by the CNN. Examples of the CNN include a U-Net and a residual network (ResNet).

Figure 11:
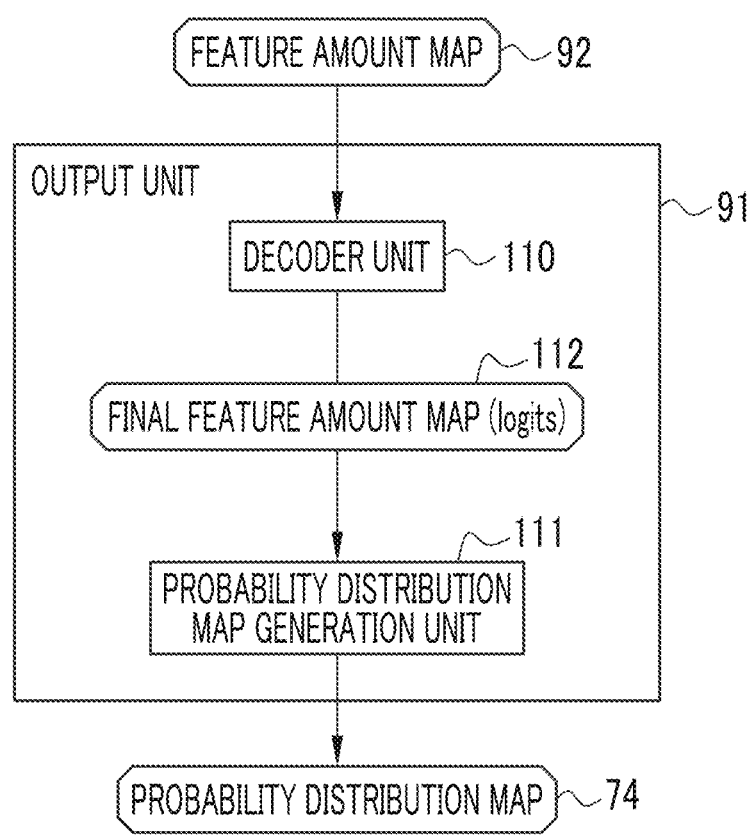
FIG. 11 is a diagram showing an output unit of the point extraction semantic segmentation model.

As an example, as shown in FIG. 11, the output unit 91 includes a decoder unit 110 and a probability distribution map generation unit 111. As described above, the decoder unit 110 performs the upsampling processing, the convolution processing, the merge processing, and the like on the feature amount map 92 to generate a final feature amount map 112. The final feature amount map 112 is also referred to as logits, and has elements corresponding to the pixels 136 of the upper part tomographic image 15 on a one-to-one basis. Each element of the final feature amount map 112 has an element value related to the center point CP of the vertebral body that is an extraction target. For example, an element value of an element in which the center point CP of the vertebral body is considered to be present is a value higher than element values of the other elements. The decoder unit 110 outputs the final feature amount map 112 to the probability distribution map generation unit 111.

The probability distribution map generation unit 111 generates the probability distribution map 74 from the final feature amount map 112 using a known activation function.

For example, a case will be considered in which, in a certain element of the final feature amount map 112, an element value that is considered as the center point CP of the vertebral body is 2 and an element value that is considered not to be the center point CP of the vertebral body is 1.5. In this case, the probability distribution map generation unit 111 applies, for example, a softmax function to calculate $e^2/(e^2+e^{1.5})$ and $e^{1.5}/(e^2+e^{1.5})$. Then, the probability distribution map generation unit 111 derives 0.62 ($\approx e^2/(e^2+e^{1.5})$) as a probability that the center point CP of the vertebral body is present in the element, that is, the presence probability, and derives 0.38 ($\approx e^{1.5}/e^2+e^{1.5})$) as a probability that the center point CP of the vertebral body is not present in the element (hereinafter referred to as the non-presence probability). Instead of the softmax function, a sigmoid function may be used.

Figure 12:
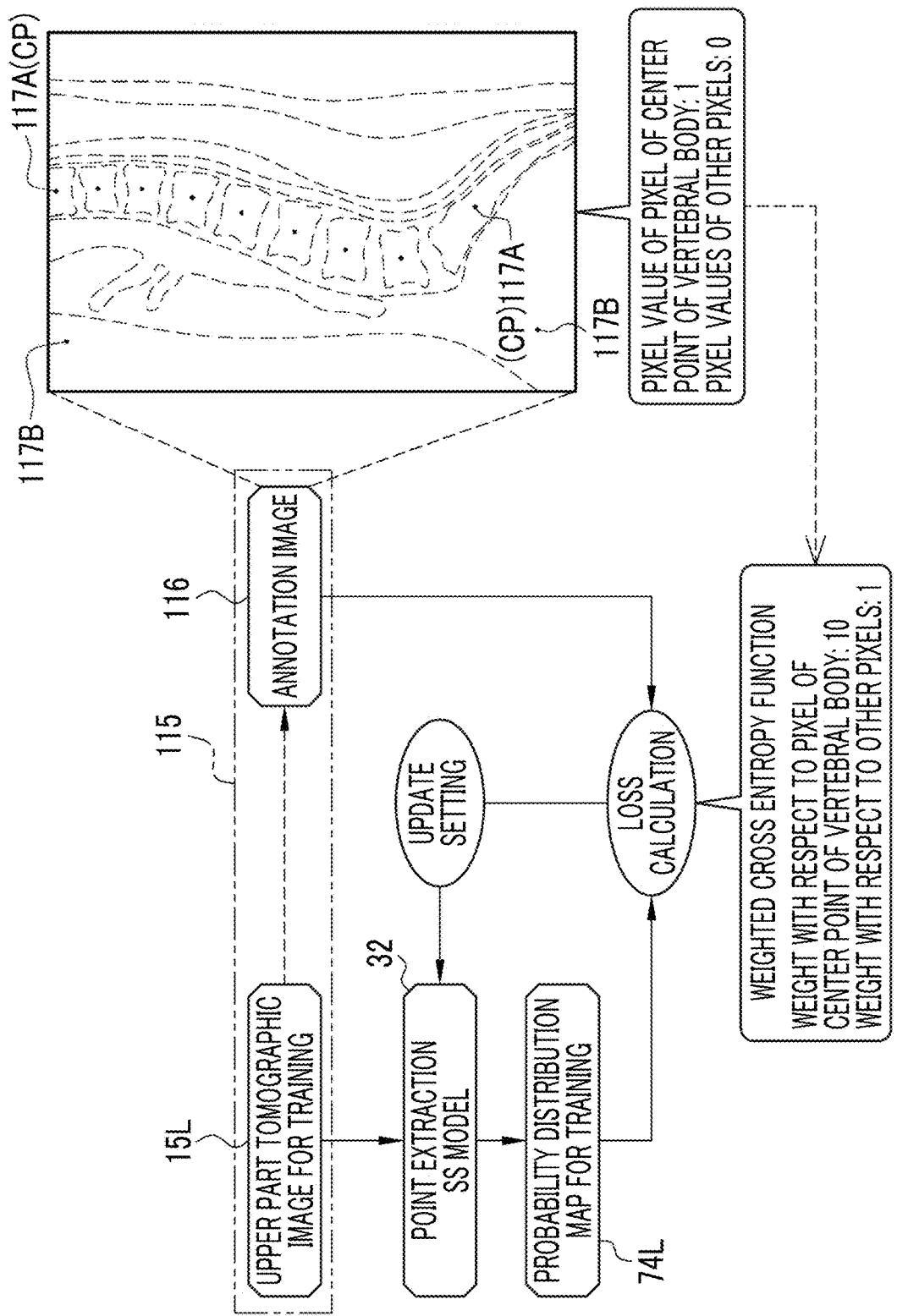
FIG. 12 is a diagram showing an outline of processing in a training phase of the point extraction semantic segmentation model.

As an example, as shown in FIG. 12, the point extraction SS model 32 is trained by giving training data (also referred to as teacher data) 115 in a training phase. The training data 115 is a set of an upper part tomographic image for training 15L and an annotation image 116 corresponding to the upper part tomographic image for training 15L. The annotation image 116 is an image in which the center point CP of the vertebral body of each vertebra VB appearing in the upper part tomographic image for training 15L is annotated. The annotation image 116 is an image in which a pixel value of a pixel 117A corresponding to the center point CP of the vertebral body is set to 1 and a pixel value of a pixel 117B other than the pixel 117A is set to 0. The pixel 117A is an example of a "first pixel" according to the technology of the present disclosure, and 1 of the pixel value of the pixel 117A is an example of a "first pixel value" according to the technology of the present disclosure. That is, the pixel 117B is an example of a "second pixel" according to the technology of the present disclosure, and 0 of the pixel value of the pixel 117B is an example of a "second pixel value" according to the technology of the present disclosure.

In the training phase, the upper part tomographic image for training 15L is input to the point extraction SS model 32. The point extraction SS model 32 outputs a probability distribution map for training 74L to the upper part tomographic image for training 15L. The loss calculation of the point extraction SS model 32 is performed based on the probability distribution map for training 74L and the annotation image 116. Then, update setting of various coefficients (coefficients of the filter F and the like) of the point extraction SS model 32 is performed according to a result of the loss calculation, and the point extraction SS model 32 is updated according to the update setting.

In the loss calculation of the point extraction SS model 32, a weighted cross entropy function is used. In a case where the presence probability of the center point CP of the vertebral body among the element values of the element 80 in the probability distribution map for training 74L and the pixel value of the annotation image 116 are values that are relatively close to each other, the cross entropy function is set to be a relatively low value. That is, in this case, the loss is estimated to be small. Conversely, in a case where the presence probability of the center point CP of the vertebral body among the element values of the element 80 in the probability distribution map for training 74L and the pixel value of the annotation image 116 are values that are relatively deviated from each other, the cross entropy function is set to be a relatively high value. That is, in this case, the loss is largely estimated.

The weight of the cross entropy function is set to, for example, 10 with respect to the pixel 117A corresponding to the center point CP of the vertebral body annotated in the annotation image 116, and is set to, for example, 1 with respect to the pixel 117B other than the pixel 117A.

In the training phase of the point extraction SS model 32, the series of pieces of processing of inputting the upper part tomographic image for training 15L to the point extraction SS model 32, outputting the probability distribution map for training 74L from the point extraction SS model 32, the loss calculation, the update setting, and updating the point extraction SS model 32 are repeatedly performed while the training data 115 are exchanged. The repetition of the series of pieces of processing is terminated in a case where the prediction accuracy of the probability distribution map for training 74L with respect to the annotation image 116 reaches a predetermined set level. The point extraction SS model 32 in which the prediction accuracy reaches the set level is stored in the storage 20, and is used in the extraction unit 42. Regardless of the prediction accuracy of the probability distribution map for training 74L with respect to the annotation image 116, the learning may be terminated in a case where the series of pieces of processing is repeated a set number of times.

Figure 13:
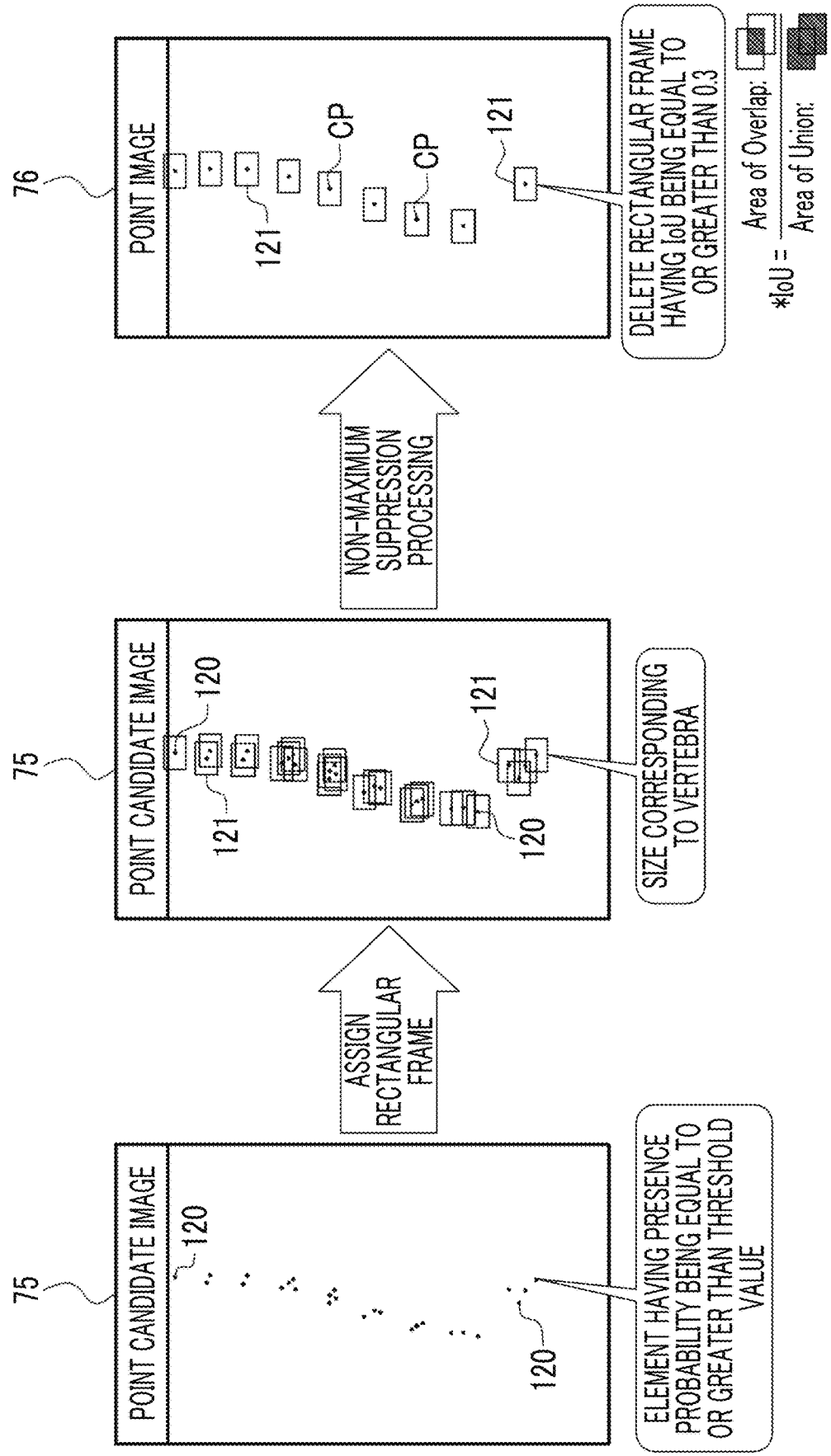
FIG. 13 is a diagram showing non-maximum suppression processing.

FIG. 13 shows an example of the non-maximum suppression processing by the non-maximum suppression processing unit 72. The point candidate image 75 is obtained by simply selecting the element 80 having the presence probability in the probability distribution map 74 being equal to or greater than the threshold value as the candidate 120. For this reason, not all the candidates 120 are truly the center point CP of the vertebral body. Therefore, by performing the non-maximum suppression processing, the true center point CP of the vertebral body is narrowed down from among a plurality of candidates 120.

The non-maximum suppression processing unit 72 first assigns a rectangular frame 121 to each candidate 120 of the point candidate image 75. The rectangular frame 121 has a preset size corresponding to the vertebra VB, for example, a size larger than the vertebra VB by one size. The center of the rectangular frame 121 coincides with the candidate 120.

Next, the non-maximum suppression processing unit 72 calculates an intersection over union (IoU) of the rectangular frame 121 assigned to each candidate 120. The IoU is a value obtained by dividing an area of overlap of two rectangular frames 121 by an area of union of the two rectangular frames 121. For two rectangular frames 121 having the IoU equal to or greater than a threshold value (for example, 0.3), the non-maximum suppression processing unit 72 leaves one representative rectangular frame 121 and deletes the other rectangular frame 121 together with the candidate 120. Accordingly, the two rectangular frames 121 in which the IoU is equal to or greater than the threshold value are unified into one rectangular frame 121. By deleting the rectangular frame 121 and the candidate 120 which overlap the adjacent rectangular frame 121 at the IoU equal to or greater than the threshold value in this manner, the point image 76 representing the center point CP of the vertebral body is finally obtained.

Figure 14:
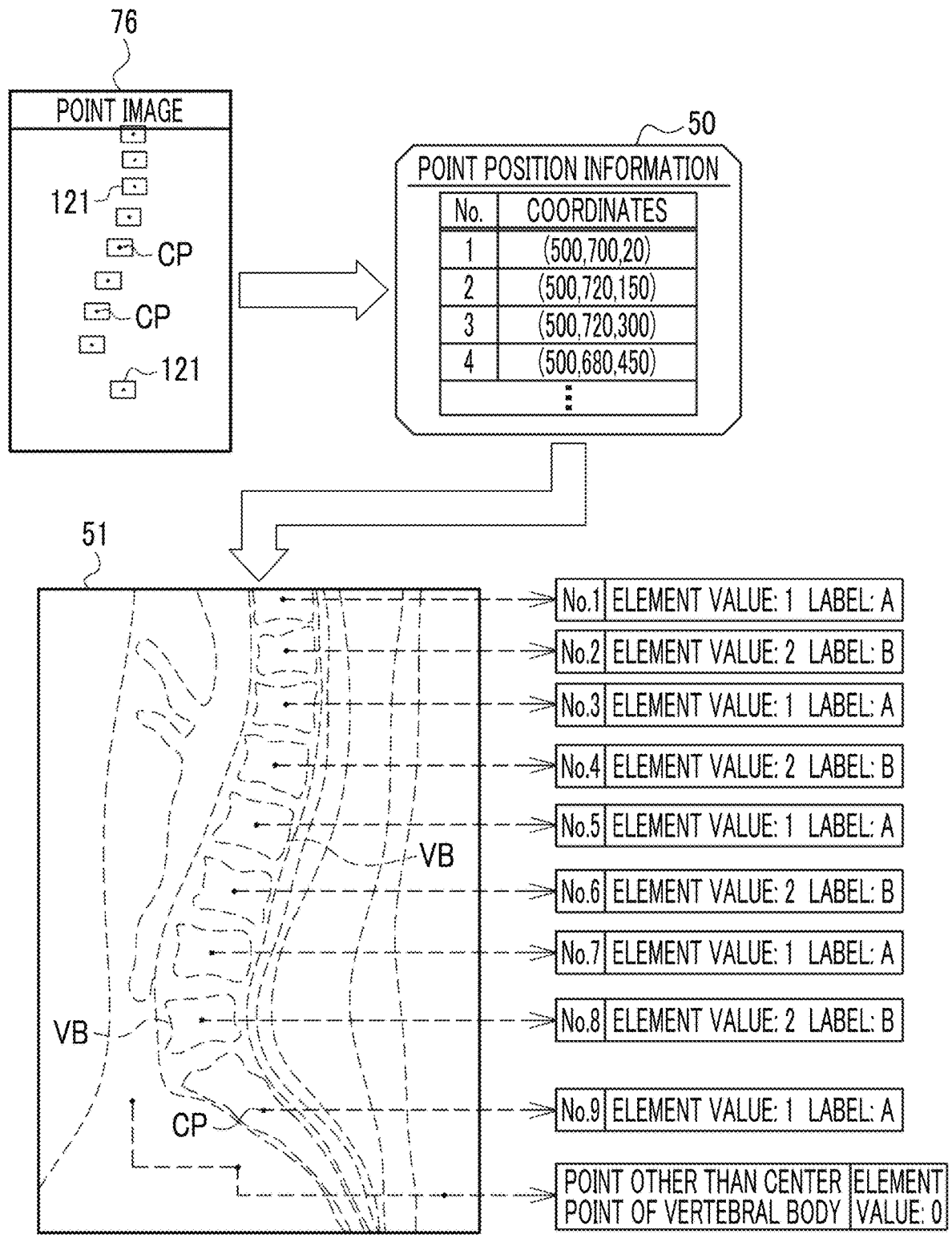
FIG. 14 is a diagram showing a state in which point position information is generated based on a point image and a point position display map is generated based on the point position information.

For example, as shown in FIG. 14, the conversion unit 73 generates the point position information 50 based on the point image 76. The point position information 50 is XYZ coordinates of the position of the center point CP of the vertebral body in the point image 76. An X-axis is an axis parallel to a right-left direction, a Y-axis is an axis parallel to a front-rear direction, and a Z-axis is an axis parallel to an up-down direction. In the present example, since the upper part tomographic image 15S of the sagittal cross section is the target, a value of the X coordinate of the XYZ coordinates of each center point CP is the same at each center point CP. Values of the Y coordinate and the Z coordinate are different depending on each center point CP. In the point position information 50, numbers (No.) are assigned in ascending order of the Z coordinate, and center points CP of the respective vertebral bodies are arranged.

The point position display map 51 is data which has elements 137 (see FIG. 16) corresponding to the pixels 136 of the upper part tomographic image 15 on a one-to-one basis, and in which an element value of the element 137 corresponding to the pixel 136 at the center point CP of the vertebral body is set to 1 or 2, and an element value of the element 137 corresponding to the pixel 136 other than the pixel 136 at the center point CP of the vertebral body is set to 0. That is, the point position display map 51 is data in which the position of the center point CP of the vertebral body is represented by the element value 1 or 2. In FIG. 14, the vertebra VB and the like are indicated by broken lines for ease of understanding, but the vertebra VB and the like do not appear in the actual point position display map 51.

For two adjacent vertebrae VB, the point position display map generation unit 43 assigns a label A by setting the element value of the element 137 corresponding to the center point CP of the vertebral body of one vertebra VB to 1 and assigns a label B by setting the element value of the element 137 corresponding to the center point CP of the vertebral body of the other vertebra VB to 2. For example, the point position display map generation unit 43 assigns the label A by setting the element value of the element 137 corresponding to the center point CP of the vertebral body of No. 1 to 1, and assigns the label B by setting the element value of the element 137 corresponding to the center point CP of the vertebral body of No. 2 to 2. Alternatively, the point position display map generation unit 43 assigns the label A by setting the element value of the element 137 corresponding to the center point CP of the vertebral body of No. 7 to 1, and assigns the label B by setting the element value of the element 137 corresponding to the center point CP of the vertebral body of No. 8 to 2. By assigning the labels A and B in this way, as a result, the point position display map generation unit 43 assigns the label A to the elements 137 corresponding to the center points CP of the vertebral bodies of Nos. 1, 3, 5, 7, and 9, and assigns the label B to the elements 137 corresponding to the center points CP of the vertebral bodies of Nos. 2, 4, 6, and 8. That is, the point position display map generation unit 43 alternately assigns the labels A and B to the center point CP of the vertebral body of each vertebra VB.

Figure 15:
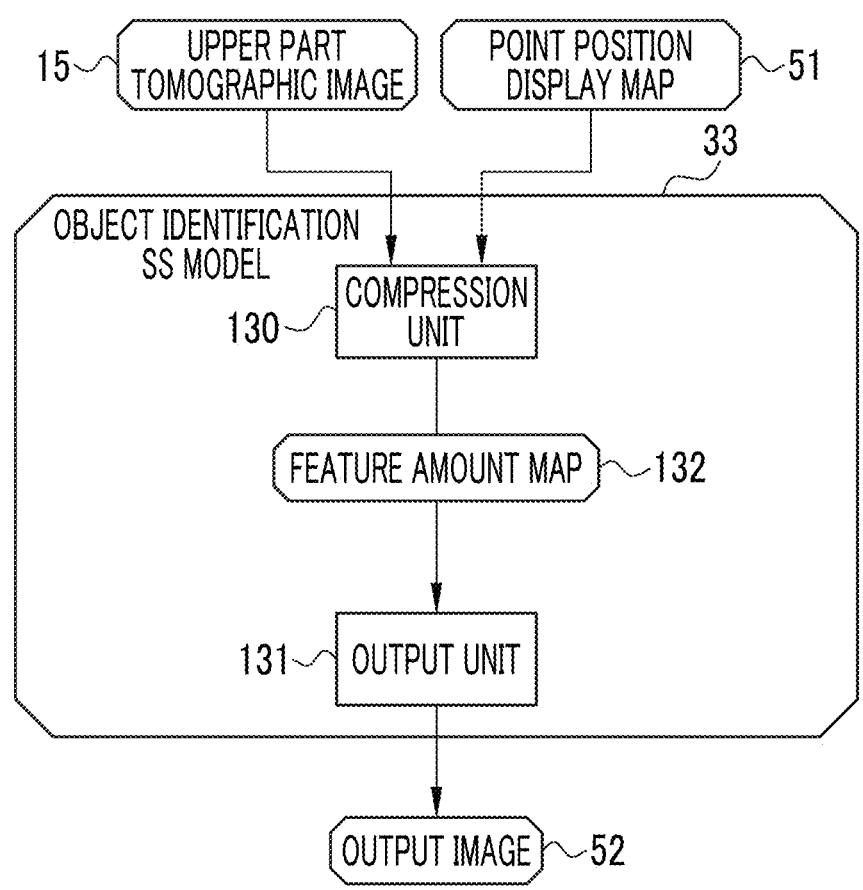
FIG. 15 is a diagram showing an object identification semantic segmentation model.

As an example, as shown in FIG. 15, the object identification SS model 33 includes a compression unit 130 and an output unit 131, similarly to the point extraction SS model 32. The upper part tomographic image 15 and the point position display map 51 are input to the compression unit 130. The upper part tomographic image 15 to be input to the compression unit 130 is, for example, the upper part tomographic image 15S of the sagittal cross section which is the source of the generation of the point position display map 51. The compression unit 130 converts the upper part tomographic image 15 and the point position display map 51 into a feature amount map 132. The compression unit 130 delivers the feature amount map 132 to the output unit 131. The output unit 131 outputs the output image 52 based on the feature amount map 132.

Figure 16:
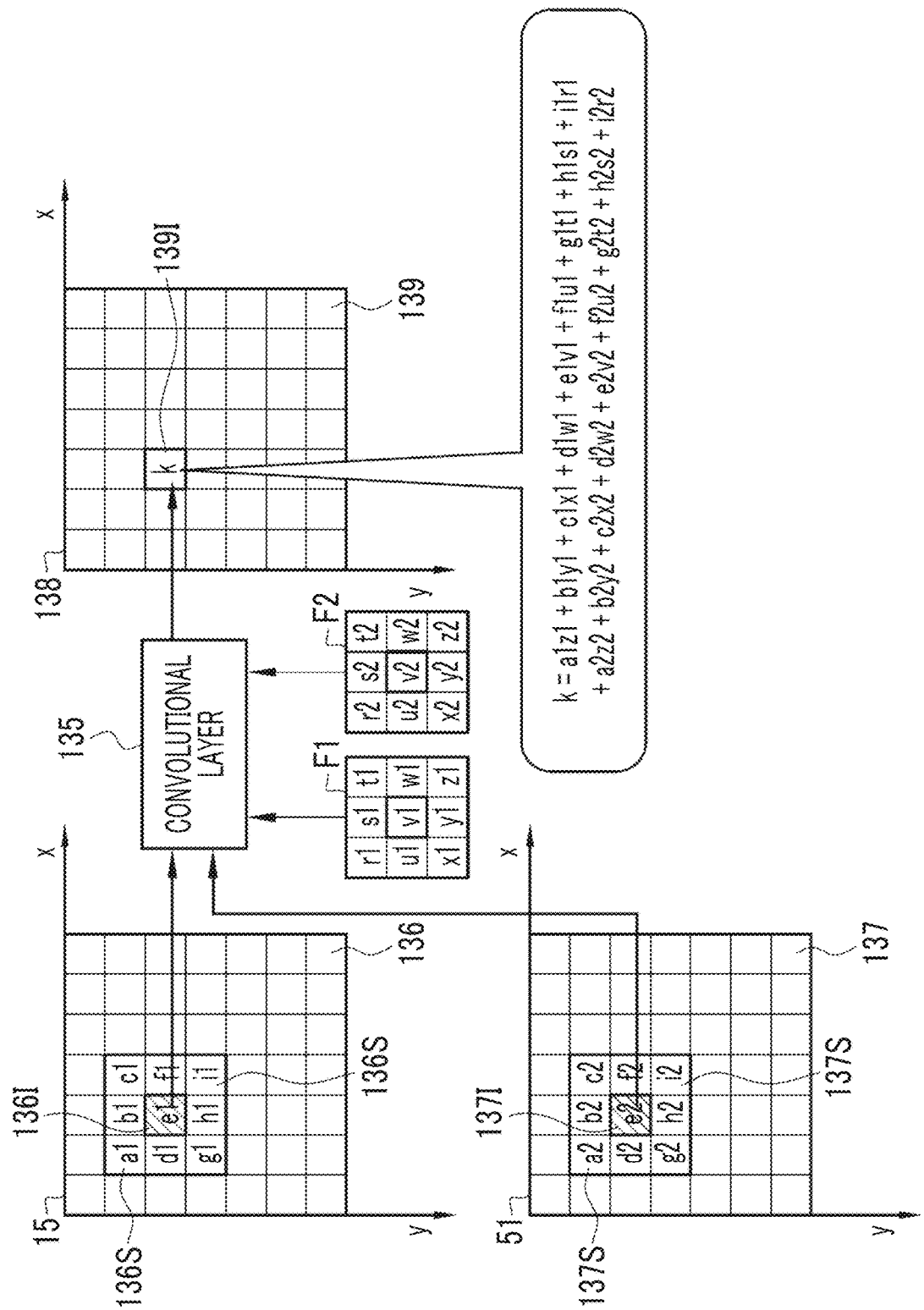
FIG. 16 is an explanatory diagram of convolution processing performed on a tomographic image and the point position display map.

For example, the compression unit 130 performs a convolution operation as shown in FIG. 16 to combine the upper part tomographic image 15 and the point position display map 51 in a channel direction.

The compression unit 130 has a convolutional layer 135 to which the upper part tomographic image 15 and the point position display map 51 are input. The convolutional layer 135 applies, for example, a 3×3 filter F1 to the upper part tomographic image 15 having a plurality of pixels 136 arranged two dimensionally. The convolutional layer 135 applies, for example, a 3×3 filter F2 to the point position display map 51 having a plurality of elements 137 arranged two dimensionally. Then, a pixel value e1 of one pixel of interest 136I among the pixels 136 and pixel values a1, b1, c1, d1, f1, g1, h1, and i1 of eight pixels 136S adjacent to the pixel of interest 136I, and an element value e2 of an element of interest 137I, which is one of the elements 137 and corresponds to the pixel of interest 136I, and element values a2, b2, c2, d2, f2, g2, h2, and i2 of eight elements 137S adjacent to the element of interest 137I are convoluted. The convolutional layer 135 sequentially performs the convolution operation while shifting the pixel of interest 136I and the element of interest 137I one by one, and outputs an element value of an element 139 of operation data 138. As a result, the operation data 138 including a plurality of elements 139 arranged two dimensionally is obtained. In this way, the upper part tomographic image 15 and the point position display map 51 are combined in the channel direction.

The coefficients of the filter F1 are set to r1, s1, t1, u1, v1, w1, x1, y1, and z1. Further, the coefficients of the filter F2 are set to r2, s2, t2, u2, v2, w2, x2, y2, and z2. In this case, the element value k of the element 139I of the operation data 138, which is a result of the convolution operation with respect to the pixel of interest 136I and the element of interest 137I, is obtained by, for example, calculating Expression (2).

$$k = a1z1 + b1y1 + c1x1 + d1w1 + e1v1 + f1u1 + g1t1 + h1s1 + i1r1 + a2z2 + b2y2 + c2x2 + d2w2 + e2v2 + f2u2 + g2t2 + h2s2 + i2r2 \quad (2)$$

The compression unit 130 includes a plurality of convolutional layers similar to the convolutional layer 95 shown in FIG. 8 in addition to the convolutional layer 135, and performs convolution processing a plurality of times. Further, the compression unit 130 includes a plurality of pooling layers similar to the pooling layer 105 shown in FIG. 10, and performs pooling processing a plurality of times. Furthermore, the compression unit 130 also performs skip layer processing of delivering the operation data by the convolution processing to the output unit 131. By repeating the convolution processing, the pooling processing, the skip layer processing, and the like a plurality of times in this way, the compression unit 130 outputs final operation data 138. The final operation data 138 is exactly the feature amount map 132.

Similarly to the output unit 91 of the point extraction SS model 32, the output unit 131 performs upsampling processing, convolution processing, merge processing, and the like on the feature amount map 132. Through such various pieces of processing, the output unit 131 outputs the output image 52 from the feature amount map 132. As described above, the object identification SS model 33 is constructed by the CNN similarly to the point extraction SS model 32.

Figure 17:
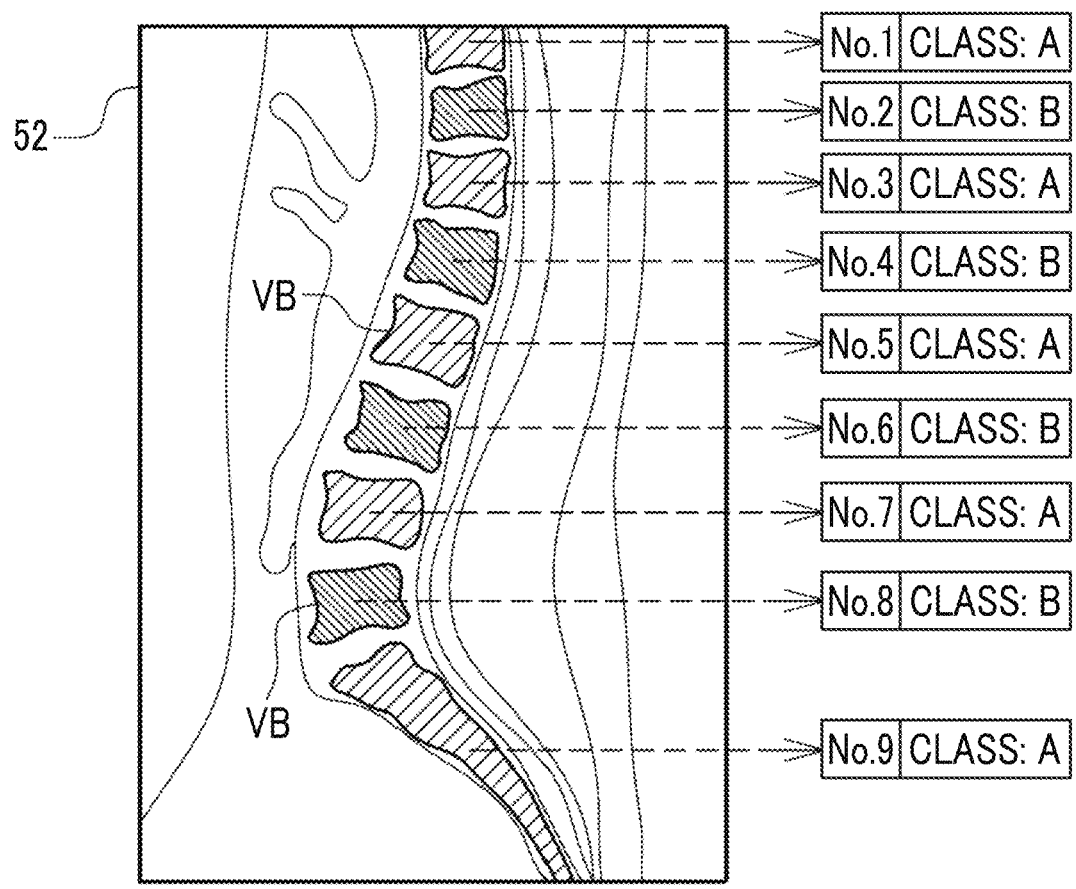
FIG. 17 is a diagram showing an output image.

As an example, as shown in FIG. 17, the output image 52 is an image in which a class is labeled to each vertebra VB. More specifically, the output image 52 is an image in which the vertebrae VB including the center points CP of the vertebral bodies of Nos. 1, 3, 5, 7, and 9 are identified as a class A corresponding to the label A, and the vertebrae VB including the center points CP of the vertebral bodies of Nos. 2, 4, 6, and 8 are identified as a class B corresponding to the label B.

Figure 18:
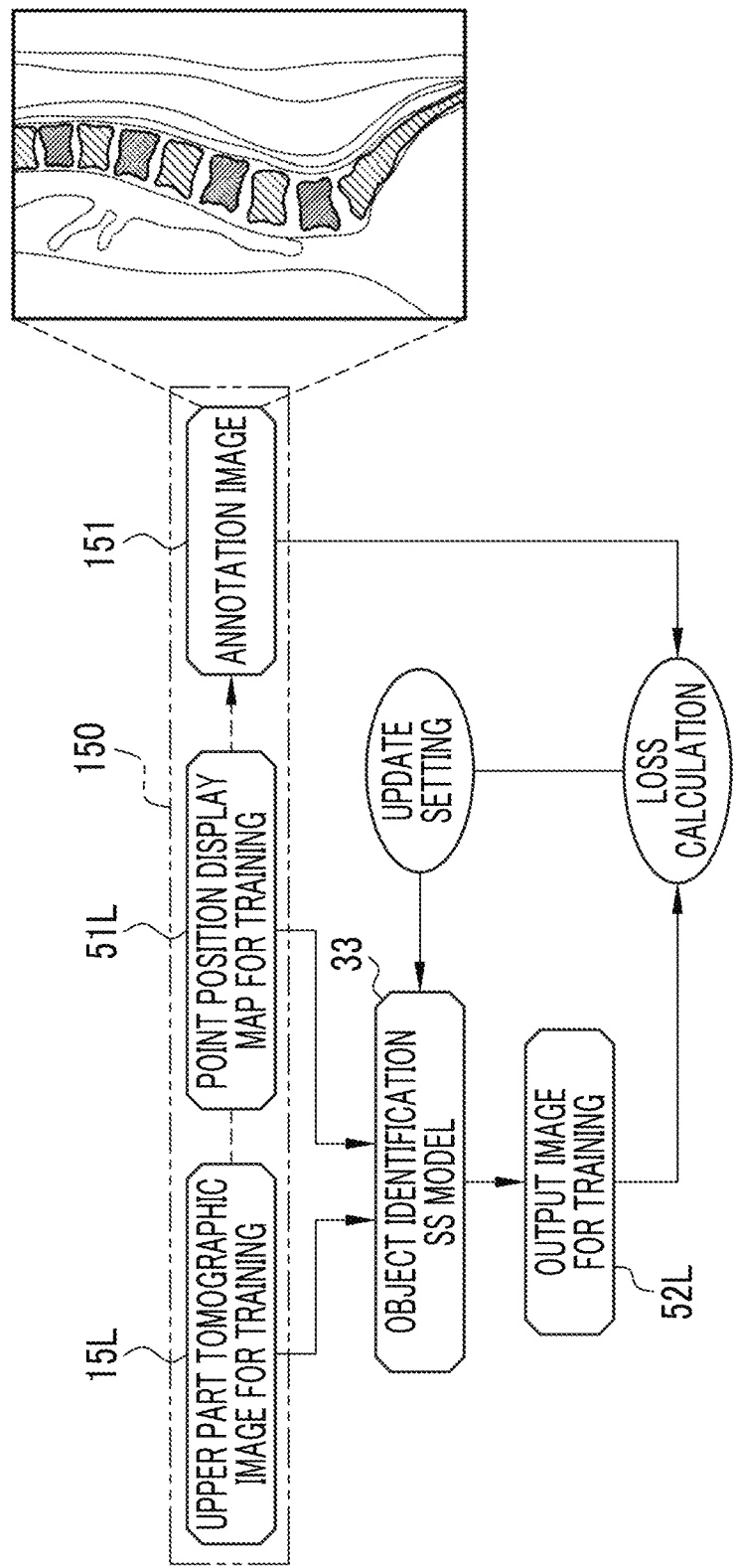
FIG. 18 is a diagram showing an outline of processing in a training phase of the object identification semantic segmentation model.

As an example, as shown in FIG. 18, the object identification SS model 33 is trained by giving training data 150 in the training phase. The training data 150 is a set of the upper part tomographic image for training 15L, a point position display map for training 51L corresponding to the upper part tomographic image for training 15L, and an annotation image 151 corresponding to the upper part tomographic image for training 15L and the point position display map for training 51L. In the point position display map for training 51L, the labels A and B are alternately assigned to the elements 137 corresponding to the center points CP of the vertebral bodies of the vertebrae VB appearing in the upper part tomographic image for training 15L. The annotation image 151 is an image in which each vertebra VB appearing in the upper part tomographic image for training 15L is labeled with a class corresponding to the label assigned in the point position display map for training 51L.

In the training phase, the upper part tomographic image for training 15L and the point position display map for training 51L are input to the object identification SS model 33. The object identification SS model 33 outputs an output image for training 52L to the upper part tomographic image for training 15L and the point position display map for training 51L. The loss calculation of the object identification SS model 33 is performed based on the output image for training 52L and the annotation image 151. Then, update setting of various coefficients (coefficients of the filters F1 and F2, and the like) of the object identification SS model 33 is performed according to a result of the loss calculation, and the object identification SS model 33 is updated according to the update setting.

In the training phase of the object identification SS model 33, the series of pieces of processing of inputting the upper part tomographic image for training 15L and the point position display map for training 51L to the object identification SS model 33, outputting the output image for training 52L from the object identification SS model 33, the loss calculation, the update setting, and updating the object identification SS model 33 are repeatedly performed while the training data 150 are exchanged. The repetition of the series of pieces of processing is terminated in a case where the prediction accuracy of the output image for training 52L with respect to the annotation image 151 reaches a predetermined set level. The object identification SS model 33 in which the prediction accuracy reaches the set level is stored in the storage 20, and is used in the object identification unit 44. Regardless of the prediction accuracy of the output image for training 52L with respect to the annotation image 151, the learning may be terminated in a case where the series of pieces of processing is repeated a set number of times.

Figure 19:
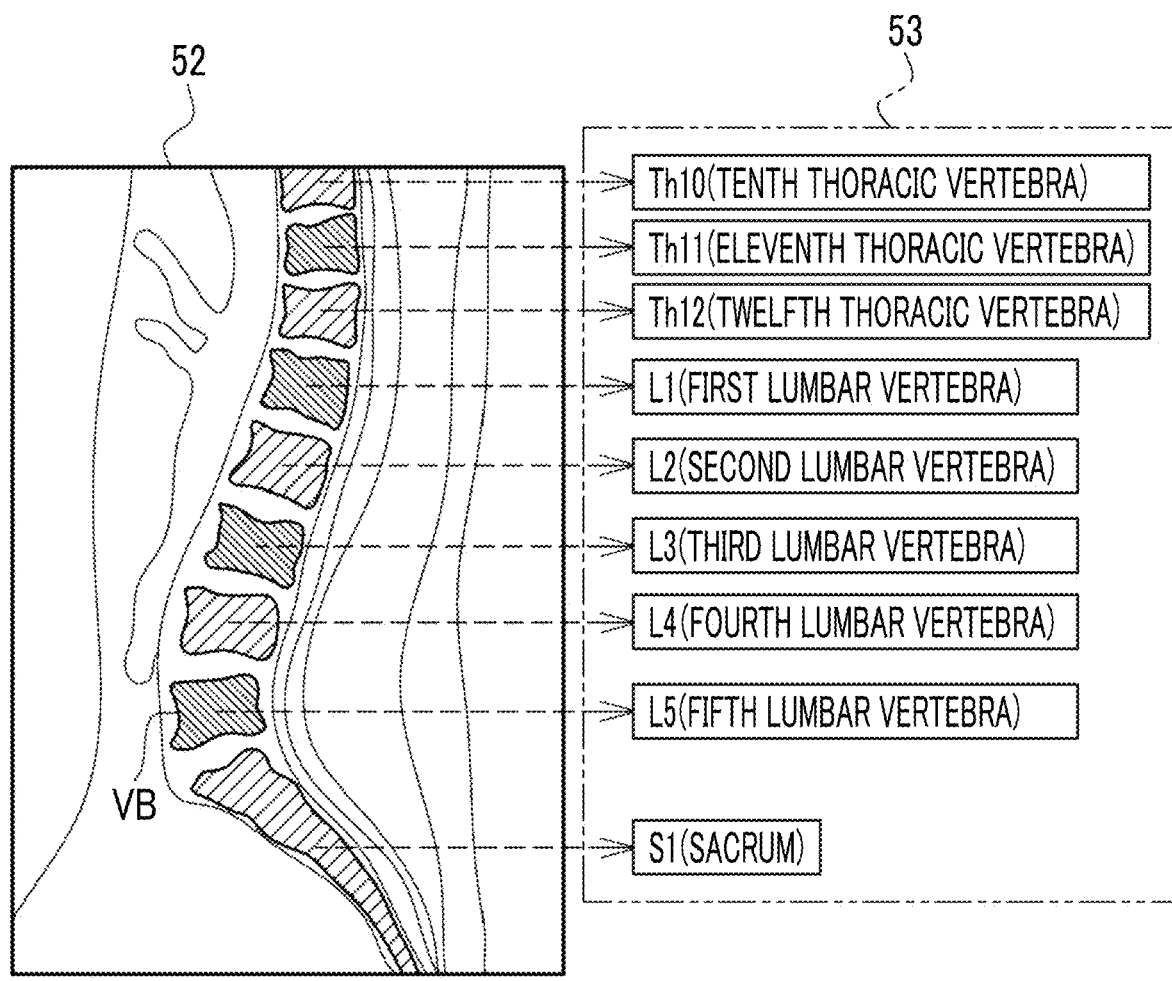
FIG. 19 is a diagram showing a labeling result.

As an example, as shown in FIG. 19, the assignment result 53 is the anatomical name of each vertebra VB, such as a tenth thoracic vertebra (Th10), a first lumbar vertebra (L1), and a sacrum (S1).

Figure 20:
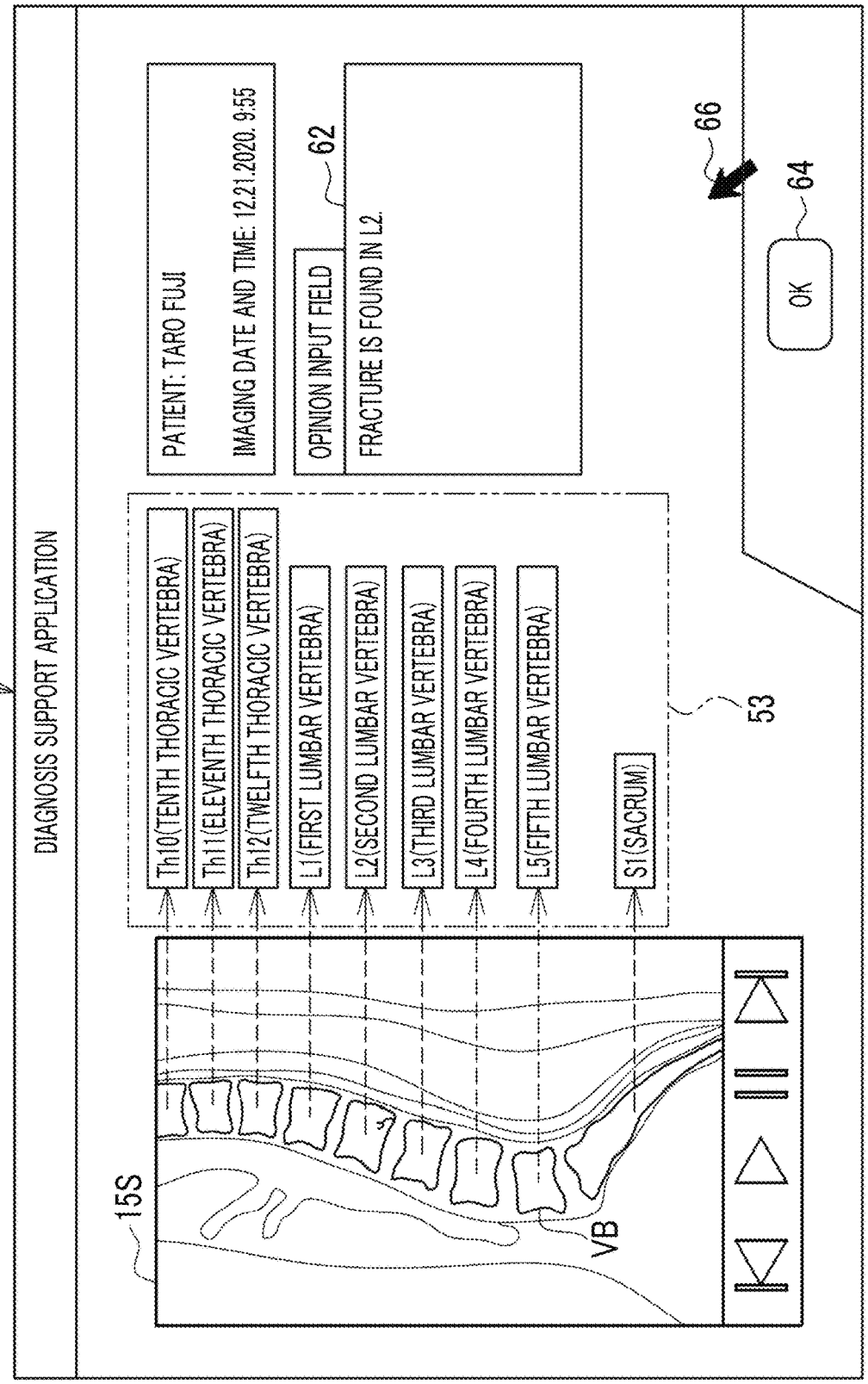
FIG. 20 is a diagram showing a second screen.

FIG. 20 shows an example of the second screen 155 that displays the assignment result 53. The display control unit 46 causes the screen to transition from the first screen 60 shown in FIG. 4 to the second screen 155. On the second screen 155, the assignment result 53 is displayed beside the upper part tomographic image 15. Similarly to the first screen 60 of FIG. 4, the opinion input field 62 and the OK button 64 are displayed on the second screen 155. The doctor inputs the opinion to the opinion input field 62 with reference to the assignment result 53, and then places the cursor 66 on the OK button 64 to select the OK button 64. Thus, the instruction receiving unit 41 receives the opinion storage instruction as in the case of FIG. 4. The RW control unit 40 stores the upper part tomographic image 15 and the opinion input to the opinion input field 62 in the storage 20 in association with each other.

Figure 21:
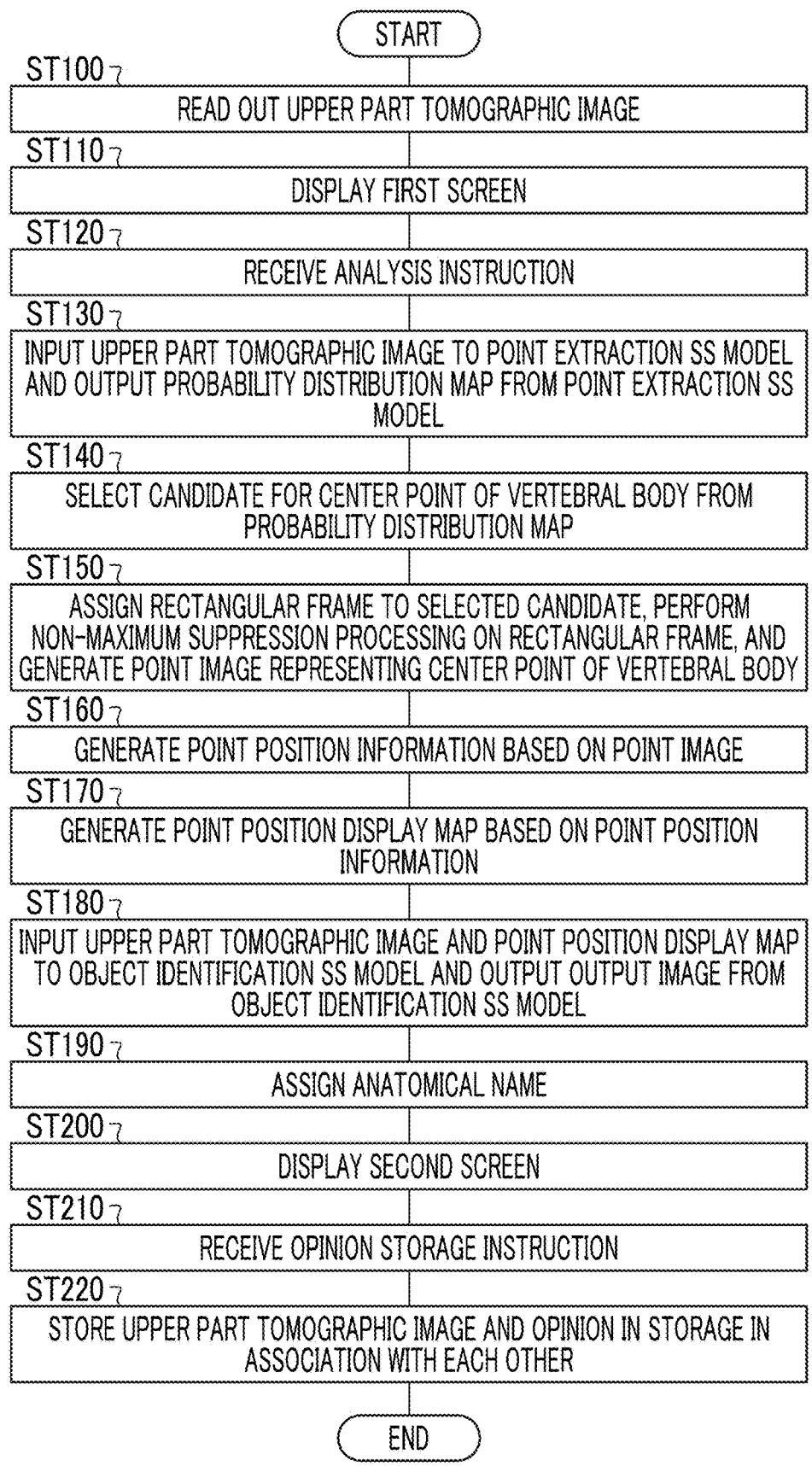
FIG. 21 is a flowchart showing a processing procedure of the diagnosis support device.

Next, an action of the above-described configuration will be described with reference to a flowchart of FIG. 21. First, in a case where the operation program 30 is activated in the diagnosis support device 12, as shown in FIG. 3, the CPU 22 of the diagnosis support device 12 functions as the RW control unit 40, the instruction receiving unit 41, the extraction unit 42, the point position display map generation unit 43, the object identification unit 44, the anatomical name assignment unit 45, and the display control unit 46.

The RW control unit 40 reads out the upper part tomographic image 15 of the patient P for which diagnosis of the spine SP is performed from the storage 20 (step ST100). The upper part tomographic image 15 is output from the RW control unit 40 to the display control unit 46. Then, the first screen 60 shown in FIG. 4 is displayed on the display 17 under the control of the display control unit 46 (step ST110).

In a case where the analysis button 65 is selected by the doctor on the first screen 60, the analysis instruction for the upper part tomographic image 15 is received by the instruction receiving unit 41 (step ST120). Accordingly, as shown in FIG. 5, in the analysis unit 70 of the extraction unit 42, the upper part tomographic image 15 is input to the point extraction SS model 32, and the probability distribution map 74 indicating the presence probability of the center point CP of the vertebral body is output from the point extraction SS model 32 (step ST130). The probability distribution map 74 is output from the analysis unit 70 to the selection unit 71.

As shown in FIG. 13, the selection unit 71 selects the element 80 having the presence probability of the center point CP of the vertebral body in the probability distribution map 74 being equal to or greater than the threshold value as the candidate 120 for the center point CP of the vertebral body (step ST140). Then, the non-maximum suppression processing unit 72 assigns the rectangular frame 121 to the candidate 120, and performs the non-maximum suppression processing on the rectangular frame 121. Accordingly, the point image 76 representing the center point CP of the vertebral body is generated (step ST150). The point image 76 is output from the non-maximum suppression processing unit 72 to the conversion unit 73.

As shown in FIG. 14, the point position information 50 indicating the XYZ coordinates of the position of the center point CP of the vertebral body in the point image 76 is generated by the conversion unit 73 based on the point image 76 (step ST160). The point position information 50 is output from the conversion unit 73 to the point position display map generation unit 43.

As shown in FIG. 14, the point position display map generation unit 43 generates the point position display map 51 based on the point position information 50 (step ST170). The point position display map 51 is output from the point position display map generation unit 43 to the object identification unit 44.

The upper part tomographic image 15 and the object identification SS model 33 are input from the RW control unit 40 to the object identification unit 44. In the object identification unit 44, as shown in FIG. 15, the upper part tomographic image 15 and the point position display map 51 are input to the object identification SS model 33. In this case, as shown in FIG. 16, the upper part tomographic image 15 and the point position display map 51 are combined in the channel direction. Then, the output image 52 is output from the object identification SS model 33 (step ST180). The output image 52 is output from the object identification unit 44 to the anatomical name assignment unit 45.

The anatomical name assignment unit 45 assigns the anatomical name to each vertebra VB identified in the output image 52 as shown in FIG. 19 (step ST190). The assignment result 53 is output from the anatomical name assignment unit 45 to the display control unit 46.

The second screen 155 shown in FIG. 20 is displayed on the display 17 under the control of the display control unit 46 (step ST200). The doctor inputs the opinion to the opinion input field 62 with reference to the assignment result 53, and then places the cursor 66 on the OK button 64 to select the OK button 64. Then, the opinion storage instruction is received by the instruction receiving unit 41 (step ST210). Then, under the control of the RW control unit 40, the upper part tomographic image 15 and the opinion input to the opinion input field 62 are stored in the storage 20 in association with each other (step ST220).

As described above, the diagnosis support device 12 uses the point extraction SS model 32. As shown in FIG. 12, the point extraction SS model 32 is trained using the annotation image 116 in which the pixel value of the pixel 117A corresponding to the center point CP of the vertebral body of each of the plurality of vertebrae VB is set to 1 and the pixel value of the pixel 117B other than the pixel 117A is set to 0. The point extraction SS model 32 is trained by assigning a greater weight to the pixel 117A corresponding to the center point CP of the vertebral body than to the pixel 117B other than the pixel 117A to calculate the loss. As shown in FIG. 5, the extraction unit 42 inputs the upper part tomographic image 15 to the point extraction SS model 32, and outputs the probability distribution map 74 indicating the presence probability of the center point CP of the vertebral body in the upper part tomographic image 15 from the point extraction SS model 32. Then, as shown in FIG. 13, the point image 76 is generated based on the probability distribution map 74, and the center point CP of the vertebral body is identified. Since the center point CP of the vertebral body is very small, the center point CP is buried and difficult to learn without any measures. However, since a greater weight is assigned to the pixel 117A corresponding to the center point CP of the vertebral body than to the pixel 117B other than the pixel 117A, it is possible to perform learning with emphasis on the center point CP of the vertebral body. Therefore, it is possible to accurately identify the center point CP of the vertebral body.

As shown in FIG. 13, the selection unit 71 selects, as the candidate 120 for the center point CP of the vertebral body, the element 80 having the presence probability being equal to or greater than the preset threshold value from among the elements 80 of the probability distribution map 74. The non-maximum suppression processing unit 72 assigns the rectangular frame 121 having the preset size to the selected candidate 120. Then, the non-maximum suppression processing is performed on the rectangular frame 121, and the center point CP of the vertebral body is identified based on a result of the non-maximum suppression processing. Therefore, a plurality of discrete points that are relatively close to each other, such as the center point CP of the vertebral body, can be accurately identified.

In the medical field, there is a very high demand for accurately identifying a structure of a body to be useful for accurate diagnosis. Therefore, the present example in which the upper part tomographic image 15, which is the medical image in which the inside of the body of the patient P appears, is set as the analysis target image and the vertebra VB, which is the structure of the body, is set as the object can be said to be a form that matches the demand.

The upper part tomographic image 15 to be input to the compression units 90 and 130 is not limited to the upper part tomographic image 15S of the sagittal cross section which is the source of the generation of the point position display map 51. In addition to the upper part tomographic image 15S of the sagittal cross section which is the source of the generation of the point position display map 51, several upper part tomographic images 15S of the sagittal cross section before and after the upper part tomographic image 15S of the sagittal cross section which is the source of the generation of the point position display map 51 may be input to the compression units 90 and 130. Alternatively, an identification result of the vertebrae VB for one upper part tomographic image 15S of the sagittal cross section may be applied to several upper part tomographic images 15S of the sagittal cross section before and after the one upper part tomographic image 15S.

The annotation image 116 is not limited to the image in which one pixel 117A indicating the center point CP of the vertebral body is annotated. The image may be an image in which a circular area composed of several to several tens of pixels centered on the center point CP of the vertebral body is annotated. Further, the point to be extracted is not limited to the center point CP of the vertebral body. The point to be extracted may be a tip of a spinous process of a vertebral arch, or the center of a vertebral foramen.

The plurality of discrete points that are relatively close to each other are not limited to the center points CP of the vertebral bodies. The plurality of discrete points may be, for example, the center points of the bones of the fingers.

In the above-described example, the element value of the label A is set to 1 and the element value of the label B is set to 2, but the technology of the present disclosure is not limited thereto. It is sufficient that the element values of the label A and the label B are different from each other. For example, the element value of the label A may be set to 1, and the element value of the label B may be set to −1.

The types of labels are not limited to two types of the labels A and B. Three or more types of labels may be assigned. For example, the label A may be assigned by setting the element values of the vertebrae VB of Nos. 1, 4, and 7 to 1, the label B may be assigned by setting the element values of the vertebrae VB of Nos. 2, 5, and 8 to 2, and a label C may be assigned by setting the element values of the vertebrae VB of Nos. 3, 6, and 9 to 3. In this case, the output image 52 is an image in which the vertebrae VB of Nos. 1, 4, and 7 are identified as the class A corresponding to the label A, the vertebrae VB of Nos. 2, 5, and 8 are identified as the class B corresponding to the label B, and the vertebrae VB of Nos. 3, 6, and 9 are identified as a class C corresponding to the label C.

In the above-described example, the aspect has been described in which the vertebra VB is identified in order to assign the anatomical name of each vertebra VB, but the technology of the present disclosure is not limited thereto. For example, the vertebra VB may be identified as preprocessing of computer-aided diagnosis (CAD) of extracting a lesion candidate, such as fracture and bone metastasis of cancer.

Second Embodiment

In the second embodiment shown in FIGS. 22 to 25, points in right and left eyeballs EB are identified as a plurality of discrete points instead of the points in the vertebrae VB in the first embodiment.

Figure 22:
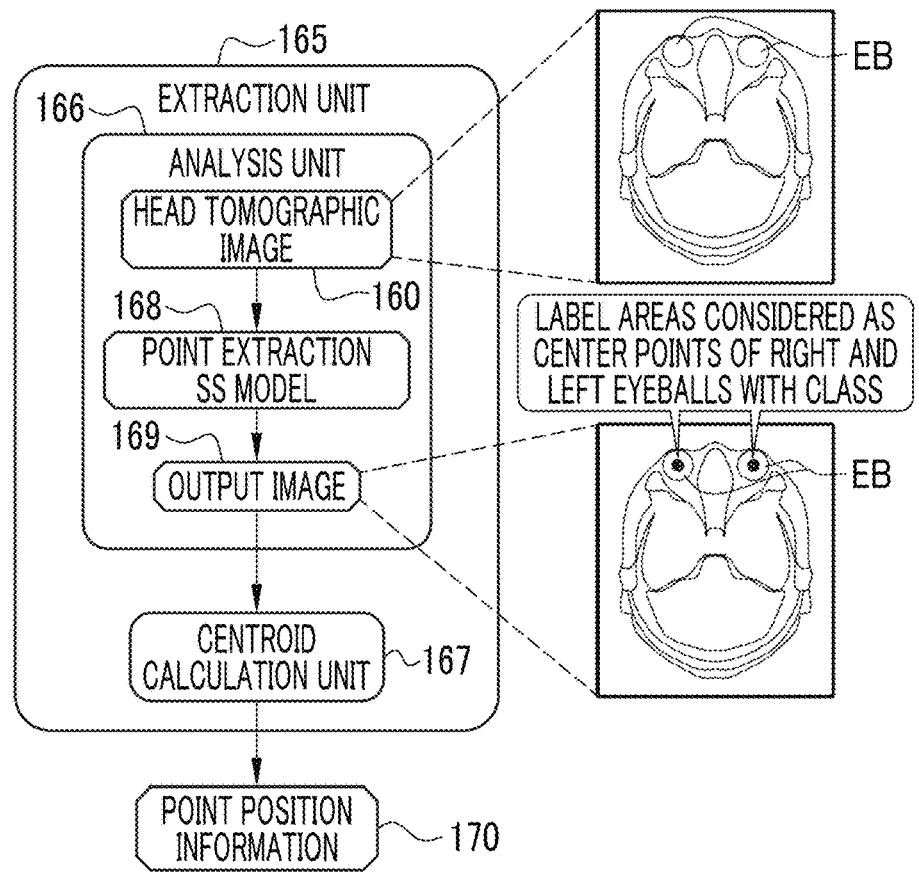
FIG. 22 is a diagram showing an extraction unit according to a second embodiment.

As an example, as shown in FIG. 22, in the second embodiment, a head tomographic image 160 in which the right and left eyeballs EB appear is handled. The head tomographic image 160 is an example of an "analysis target image" and a "medical image" according to the technology of the present disclosure. The eyeball EB is an example of an "object" and a "structure" according to the technology of the present disclosure.

An extraction unit 165 of the present embodiment includes an analysis unit 166 and a centroid calculation unit 167. The analysis unit 166 inputs the head tomographic image 160 to a point extraction SS model 168, and outputs an output image 169 from the point extraction SS model 168. The output image 169 is an image in which areas considered as center points of the right and left eyeballs EB appearing in the head tomographic image 160 are labeled as a class. The analysis unit 166 outputs the output image 169 to the centroid calculation unit 167. The centroid calculation unit 167 generates point position information 170 indicating the center points of the right and left eyeballs EB based on the output image 169. The center points of the right and left eyeballs EB is an example of a "plurality of discrete points" according to the technology of the present disclosure.

Figure 23:
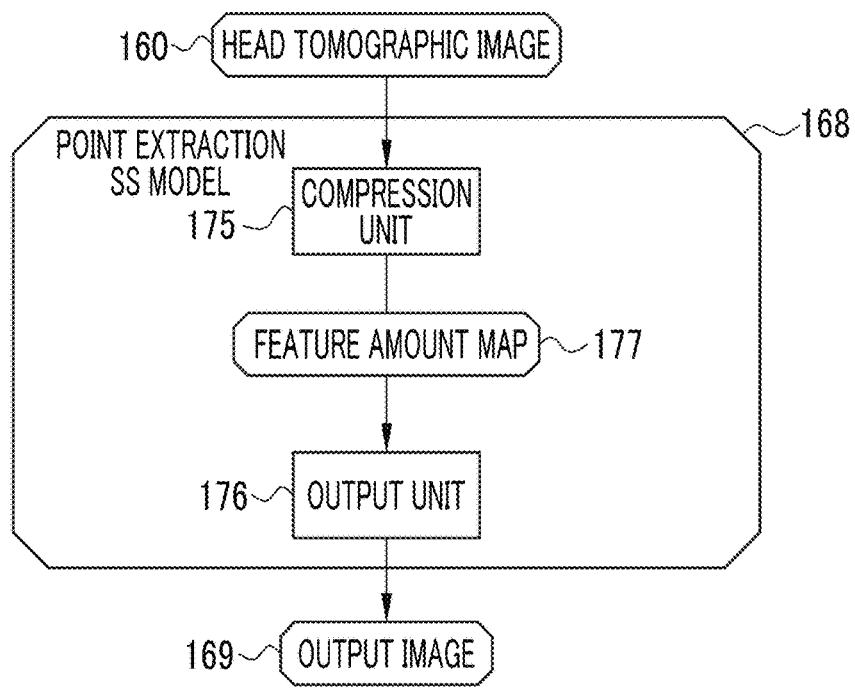
FIG. 23 is a diagram showing a point extraction semantic segmentation model according to the second embodiment.

As an example, as shown in FIG. 23, similarly to the point extraction SS model 32 and the like, the point extraction SS model 168 includes a compression unit 175 and an output unit 176, and is constructed by the CNN. The head tomographic image 160 is input to the compression unit 175. The compression unit 175 converts the head tomographic image 160 into a feature amount map 177. The compression unit 175 delivers the feature amount map 177 to the output unit 176. The output unit 176 outputs the output image 169 based on the feature amount map 177. Note that, similarly to the point extraction SS model 32 according to the first embodiment, the point extraction SS model 168 is trained by assigning a greater weight to the pixels corresponding to the center points of the right and left eyeballs EB than to the other pixels to calculate a loss.

Figure 24:
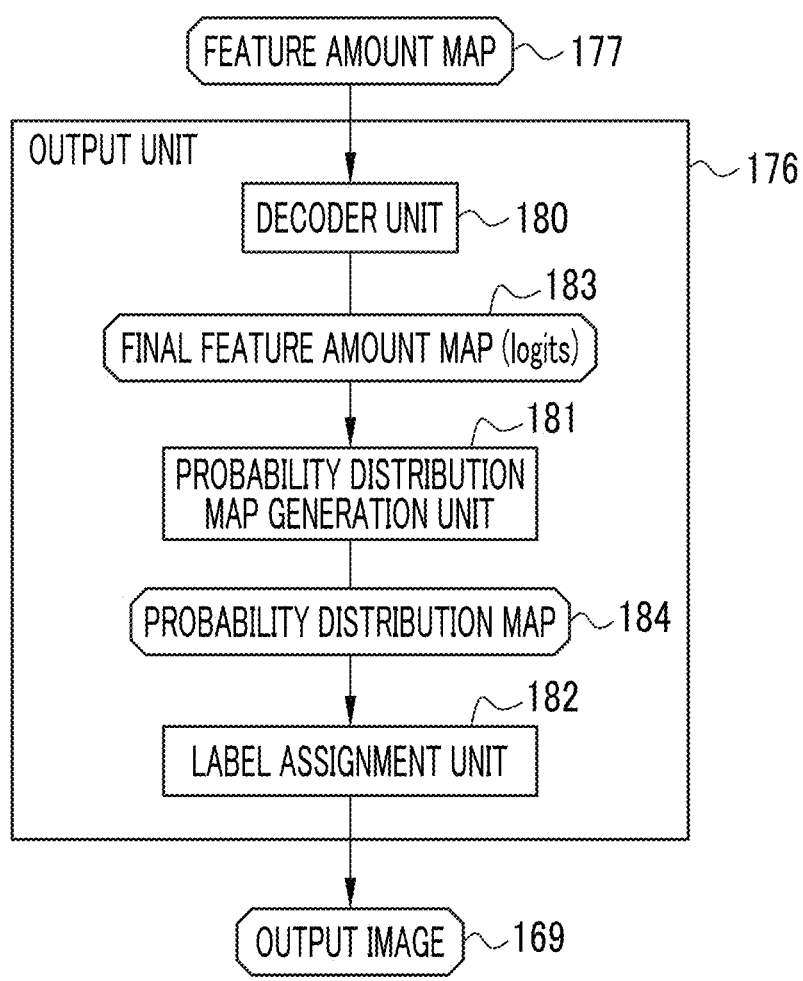
FIG. 24 is a diagram showing an output unit of the point extraction semantic segmentation model according to the second embodiment.

For example, as shown in FIG. 24, the output unit 176 includes a decoder unit 180 and a probability distribution map generation unit 181 similarly to the output unit 91 of the point extraction SS model 32. The output unit 176 includes a label assignment unit 182. The decoder unit 180 performs upsampling processing, convolution processing, merge processing, and the like on the feature amount map 177 to generate a final feature amount map 183. The final feature amount map 183 has elements corresponding to pixels of the head tomographic image 160 on a one-to-one basis. Each element of the final feature amount map 183 has an element value related to the center points of the right and left eyeballs EB that are extraction targets. For example, element values of elements in which the center points of the right and left eyeballs EB are considered to be present are values higher than element values of the other elements. The decoder unit 180 outputs the final feature amount map 183 to the probability distribution map generation unit 181.

The probability distribution map generation unit 181 generates a probability distribution map 184 from the final feature amount map 183. The probability distribution map 184 indicates a presence probability of the center points of the right and left eyeballs EB. The probability distribution map generation unit 181 outputs the probability distribution map 184 to the label assignment unit 182. The probability distribution map 184 is an example of a "feature amount map" according to the technology of the present disclosure.

The label assignment unit 182 labels each element of the probability distribution map 184 with any one of a class indicating the center points of the eyeballs EB or a class indicating a point other than the center points of the eyeballs EB. The label assignment unit 182 labels an element in which the presence probability of the element value is greater than the non-presence probability (presence probability>non-presence probability) with the class indicating the center points of the eyeballs EB. On the other hand, the label assignment unit 182 labels an element in which the presence probability of the element value is equal to or smaller than the non-presence probability (presence probability≤non-presence probability) with the class indicating the point other than the center points of the eyeballs EB. As a result, the output image 169 in which the areas considered as the center points of the right and left eyeballs EB are labeled as a class is obtained.

Figure 25:
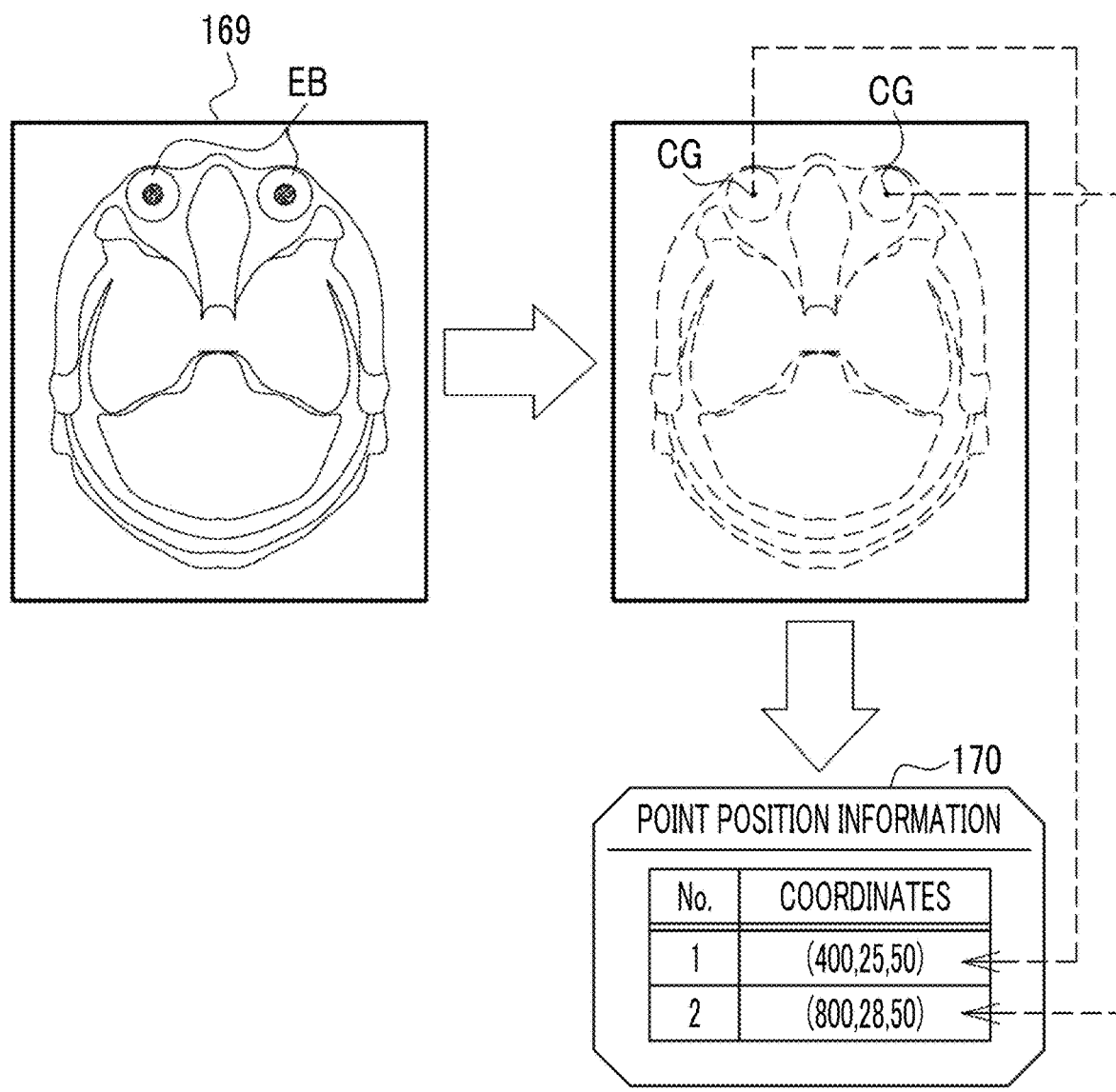
FIG. 25 is a diagram showing a state in which point position information is generated based on an output image.

For example, as shown in FIG. 25, the centroid calculation unit 167 calculates a centroid CG of each of the two areas labeled as the center points of the right and left eyeballs EB of the output image 169. The centroid calculation unit 167 generates the point position information 170 in which coordinates of the calculated centroid CG are registered as coordinates of the center points of the right and left eyeballs EB.

As described above, in the second embodiment, the extraction unit 165 generates the output image 169 in which each pixel is labeled with a class corresponding to the presence probability in the probability distribution map 184. Then, the center points of the right and left eyeballs EB are identified based on the output image 169. Therefore, it is possible to accurately identify the plurality of discrete points which are relatively distant from each other, such as the center points of the right and left eyeballs EB.

The plurality of discrete points relatively distant from each other are not limited to the center points of the right and left eyeballs EB. The plurality of discrete points may be center points of a right hippocampus and a left hippocampus of the brain.

Third Embodiment

In the first embodiment and the second embodiment, the plurality of discrete points corresponding to the plurality of objects are identified, but the technology of the present disclosure is not limited thereto. As in the third embodiment shown in FIGS. 26 to 28, one point corresponding to the object may be identified.

Figure 26:
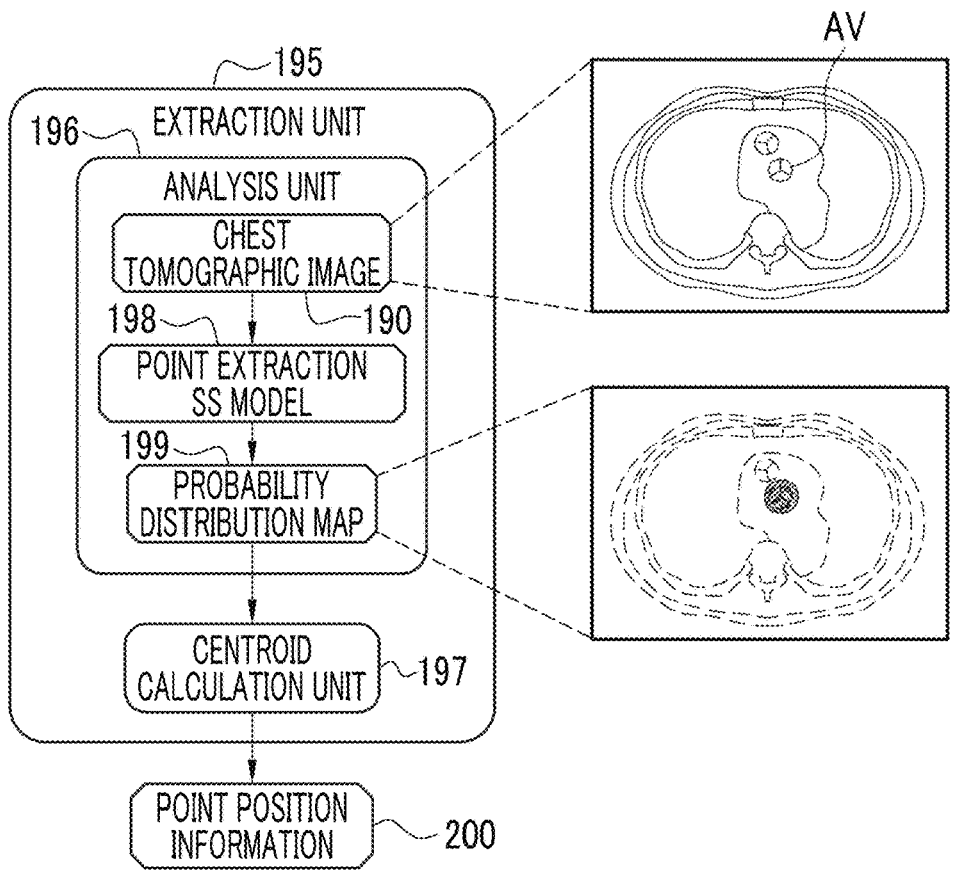
FIG. 26 is a diagram showing an extraction unit according to a third embodiment.

As an example, as shown in FIG. 26, in the third embodiment, a chest tomographic image 190 in which an aortic valve AV appears is handled. The chest tomographic image 190 is an example of an "analysis target image" and a "medical image" according to the technology of the present disclosure. The aortic valve AV is an example of an "object" and a "structure" according to the technology of the present disclosure.

An extraction unit 195 of the present embodiment includes an analysis unit 196 and a centroid calculation unit 197. The analysis unit 196 inputs the chest tomographic image 190 to a point extraction SS model 198, and outputs a probability distribution map 199 from the point extraction SS model 198. The probability distribution map 199 indicates a presence probability of a center point of the aortic valve AV. The analysis unit 196 outputs the probability distribution map 199 to the centroid calculation unit 197. The centroid calculation unit 197 generates point position information 200 indicating the center point of the aortic valve AV based on the probability distribution map 199. Similarly to the point extraction SS model 32 according to the first embodiment and the like, the point extraction SS model 198 is trained by assigning a greater weight to a pixel corresponding to the center point of the aortic valve AV than to the other pixels to calculate a loss. In addition, the center point of the aortic valve AV is an example of "one point" according to the technology of the present disclosure. The probability distribution map 199 is an example of a "feature amount map" according to the technology of the present disclosure.

Figure 27:
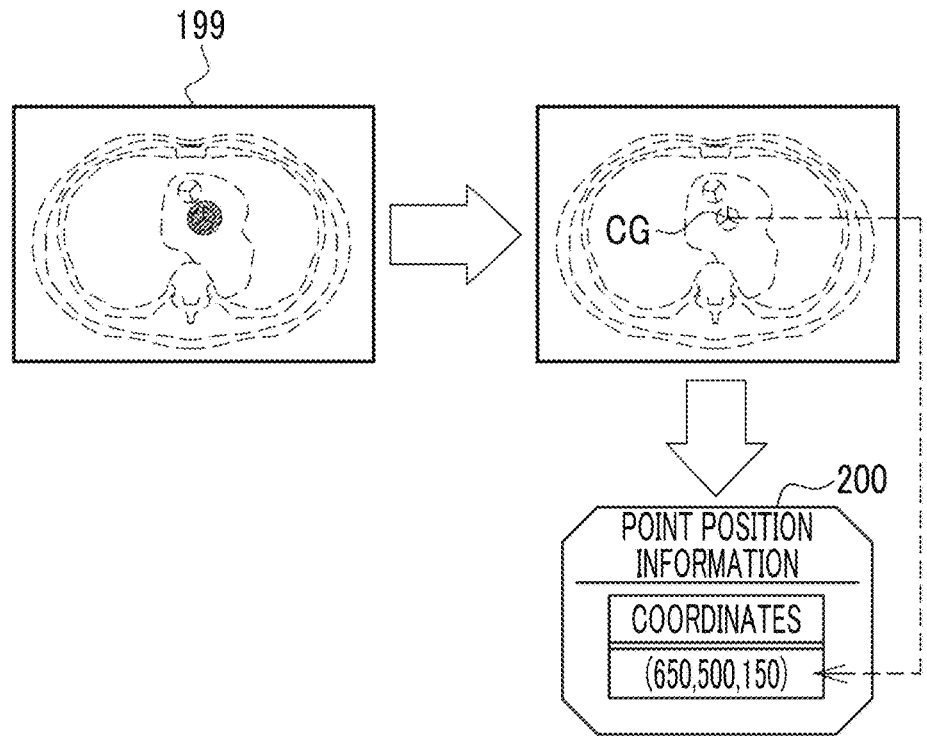
FIG. 27 is a diagram showing a state in which point position information is generated based on a probability distribution map.

As an example, as shown in FIG. 27, the centroid calculation unit 197 calculates the centroid CG of the presence probability of the center point of the aortic valve AV of the element value of the probability distribution map 199. In a case where a coordinate vector of each element of the probability distribution map 199 is denoted by r and the presence probability of the center point of the aortic valve AV of the element value of the probability distribution map 199 is denoted by ρ(r), the centroid CG is represented by Expression (3).

$$CG = (\Sigma \rho(r) \cdot r) / \Sigma \rho(r) \qquad (3)$$

That is, the centroid CG is a value obtained by dividing the sum of the products of the presence probability ρ(r) of the center point of the aortic valve AV and the coordinate vector r of each element of the probability distribution map 199 by the sum of the presence probabilities ρ(r) of the center points of the aortic valves AV. The centroid calculation unit 197 generates the point position information 200 in which coordinates of the calculated centroid CG are registered as coordinates of the center point of the aortic valve AV.

As described above, in the third embodiment, the extraction unit 195 identifies the centroid CG of the probability distribution map 199 based on the presence probability of the center point of the aortic valve AV as one point. Therefore, it is possible to accurately identify one point such as the center point of the aortic valve AV.

Figure 28:
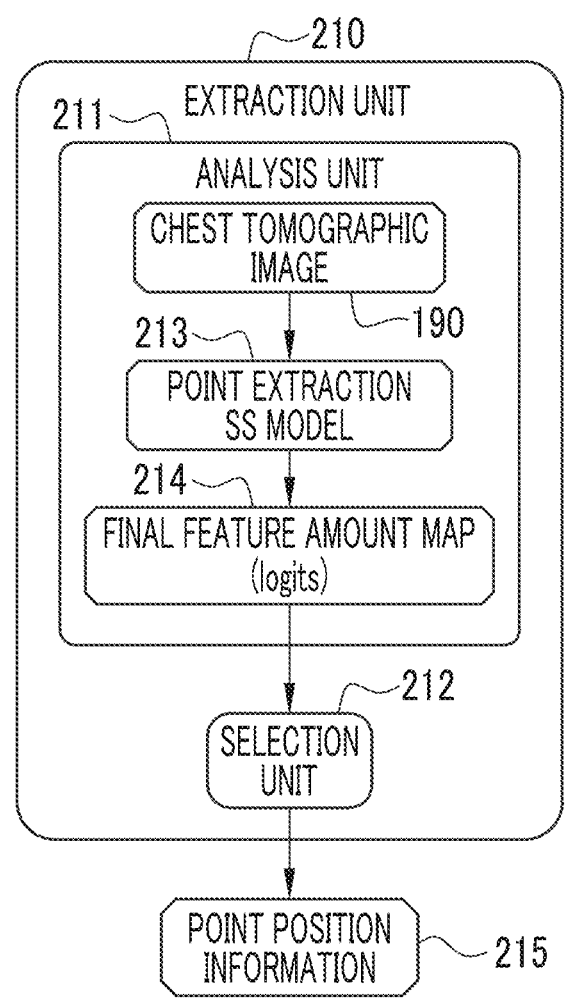
FIG. 28 is a diagram showing another example of the extraction unit according to the third embodiment.

As an example, as shown in FIG. 28, the center point of the aortic valve AV may be identified based on a final feature amount map 214 instead of the probability distribution map 199.

In FIG. 28, the extraction unit 210 includes an analysis unit 211 and a selection unit 212. The analysis unit 211 inputs the chest tomographic image 190 to the point extraction SS model 213, and outputs the final feature amount map 214 from the point extraction SS model 213. The final feature amount map 214 has elements corresponding to pixels of the chest tomographic image 190 on a one-to-one basis. Each element of the final feature amount map 214 has an element value related to the center point of the aortic valve AV that is an extraction target. For example, an element value of an element in which the aortic valve AV is considered to be present is a value higher than element values of the other elements. The final feature amount map 214 is an example of a "feature amount map" according to the technology of the present disclosure. The analysis unit 211 outputs the final feature amount map 214 to the selection unit 212. Note that, similarly to the point extraction SS model 198, the point extraction SS model 213 is also trained by assigning a greater weight to a pixel corresponding to the center point of the aortic valve AV than to the other pixels to calculate a loss.

The selection unit 212 selects an element having the maximum element value in the final feature amount map 214 as the centroid of the final feature amount map 214. The selection unit 212 generates point position information 215 in which coordinates of the element having the maximum element value in the final feature amount map 214 are registered as coordinates of the center point of the aortic valve AV.

In this manner, the extraction unit 210 identifies the centroid (element having the maximum element value) of the final feature amount map 214 as one point. Also by this method, it is possible to accurately identify one point such as the center point of the aortic valve AV.

The one point is not limited to the center point of the aortic valve AV. The one point may be a center point of a pulmonary valve, a center point of a mitral valve, or the like.

Fourth Embodiment

In each of the above-described embodiments, the point is identified, but the technology of the present disclosure is not limited thereto. As in the fourth embodiment shown in FIGS. 29 to 35, a line corresponding to an object having a line structure may be identified.

Figure 29:
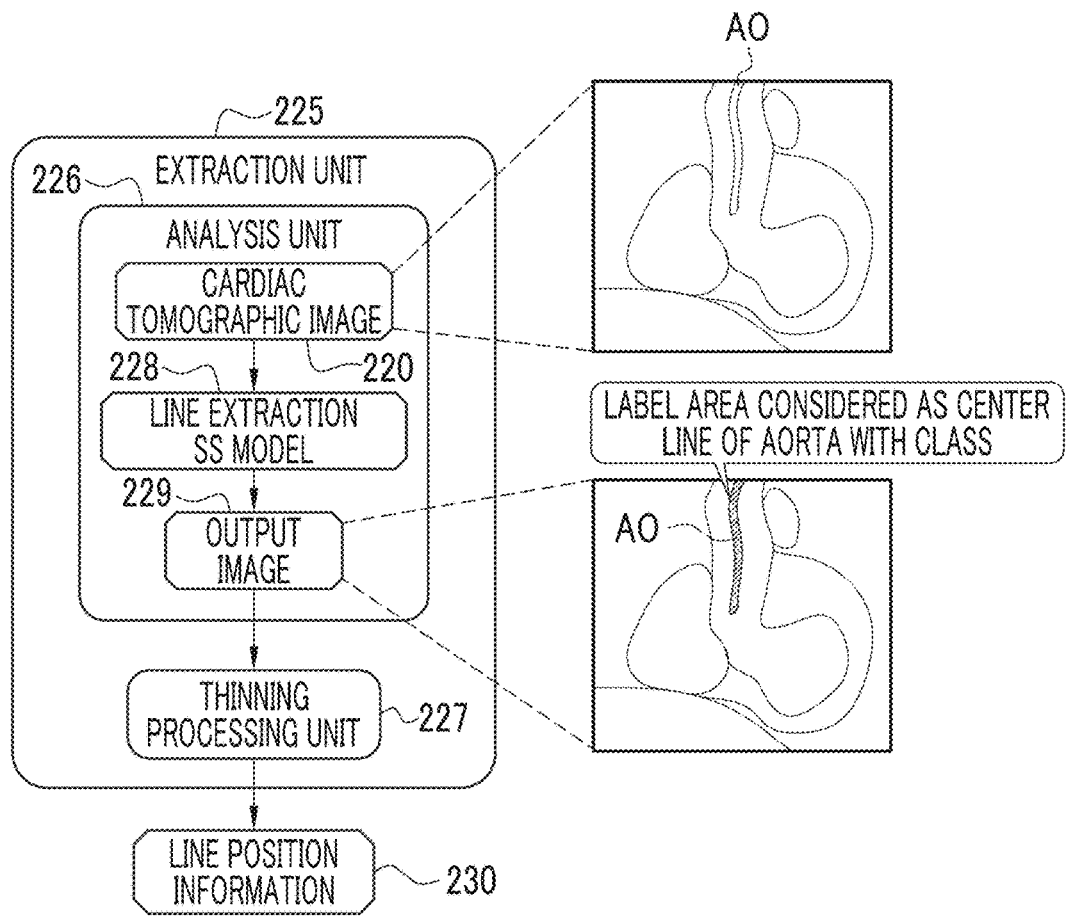
FIG. 29 is a diagram showing an extraction unit according to a fourth embodiment.

For example, as shown in FIG. 29, in the fourth embodiment, a cardiac tomographic image 220 in which an aorta AO of the heart appears is handled. The cardiac tomographic image 220 is an example of an "analysis target image" and a "medical image" according to the technology of the present disclosure. In addition, the aorta AO is an example of an "object" and a "structure" according to the technology of the present disclosure.

An extraction unit 225 of the present embodiment includes an analysis unit 226 and a thinning processing unit 227. The analysis unit 226 inputs the cardiac tomographic image 220 to a line extraction SS model 228, and outputs an output image 229 from the line extraction SS model 228. The output image 229 is an image in which an area considered as a center line of the aorta AO appearing in the cardiac tomographic image 220 is labeled as a class. The analysis unit 226 outputs the output image 229 to the thinning processing unit 227. The thinning processing unit 227 generates line position information 230 indicating the center line of the aorta AO based on the output image 229. In addition, the center line of the aorta AO is an example of a "line" according to the technology of the present disclosure.

Figure 30:
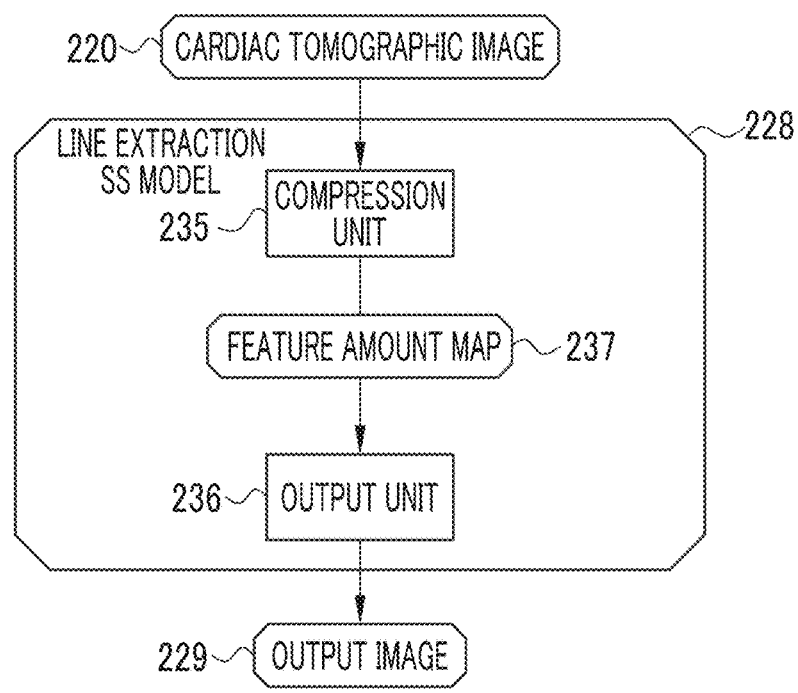
FIG. 30 is a diagram showing a line extraction semantic segmentation model according to the fourth embodiment.

As an example, as shown in FIG. 30, the line extraction SS model 228 includes a compression unit 235 and an output unit 236, and is constructed by the CNN, similarly to the point extraction SS model 32 and the like. The cardiac tomographic image 220 is input to the compression unit 235. The compression unit 235 converts the cardiac tomographic image 220 into a feature amount map 237. The compression unit 235 delivers the feature amount map 237 to the output unit 236. The output unit 236 outputs the output image 229 based on the feature amount map 237. Note that, similarly to the point extraction SS model 32 according to the first embodiment and the like, the line extraction SS model 228 is trained by assigning a greater weight to a pixel corresponding to the center line of the aorta AO than to the other pixels to calculate a loss.

Figure 31:
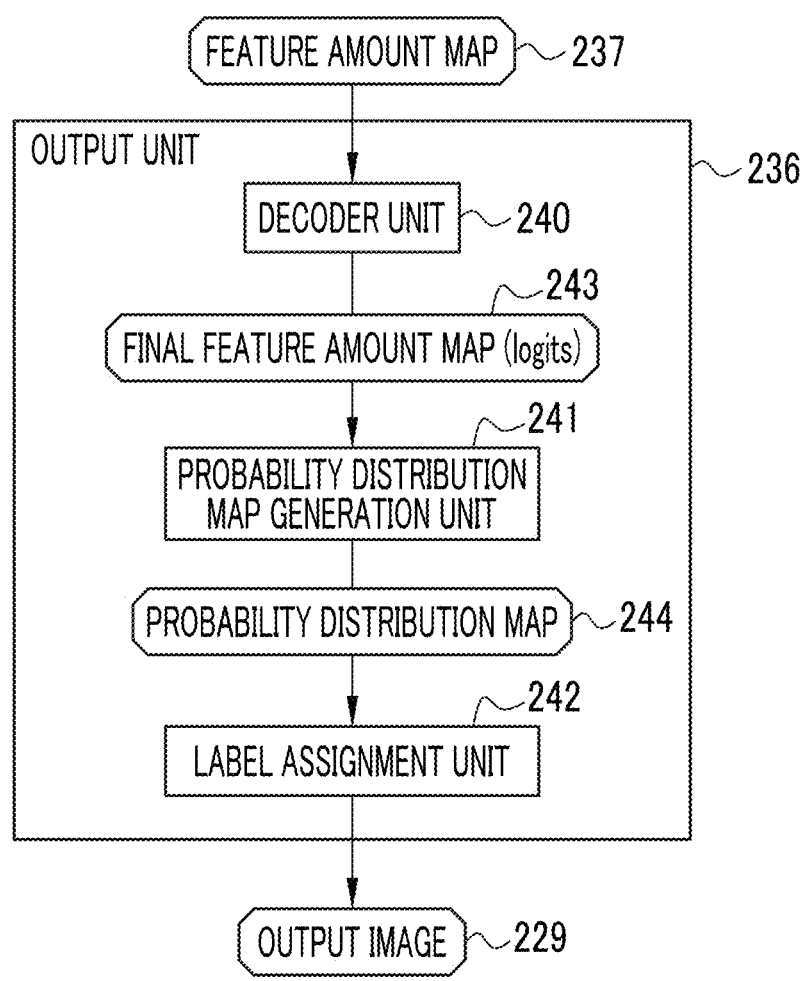
FIG. 31 is a diagram showing an output unit of the line extraction semantic segmentation model according to the fourth embodiment.

As an example, as shown in FIG. 31, the output unit 236 includes a decoder unit 240, a probability distribution map generation unit 241, and a label assignment unit 242, similarly to the output unit 176 of the point extraction SS model 168 according to the second embodiment. The decoder unit 240 performs upsampling processing, convolution processing, merge processing, and the like on the feature amount map 237 to generate a final feature amount map 243. The final feature amount map 243 has elements corresponding to pixels of the cardiac tomographic image 220 on a one-to-one basis. Each element of the final feature amount map 243 has an element value related to the center line of the aorta AO that is an extraction target. For example, an element value of an element in which the center line of the aorta AO is considered to be present is a value higher than element values of the other elements. The decoder unit 240 outputs the final feature amount map 243 to the probability distribution map generation unit 241.

The probability distribution map generation unit 241 generates a probability distribution map 244 from the final feature amount map 243. The probability distribution map 244 indicates a presence probability of the center line of the aorta AO. The probability distribution map generation unit 241 outputs the probability distribution map 244 to the label assignment unit 242. The probability distribution map 244 is an example of a "feature amount map" according to the technology of the present disclosure.

The label assignment unit 242 labels each element of the probability distribution map 244 with any one of a class indicating the center line of the aorta AO or a class indicating a line other than the center line of the aorta AO. The label assignment unit 242 labels an element in which the presence probability of the element value is greater than the non-presence probability (presence probability>non-presence probability) with the class indicating the center line of the aorta AO. On the other hand, the label assignment unit 242 labels an element in which the presence probability of the element value is equal to or smaller than the non-presence probability (presence probability≤non-presence probability) with the class indicating the line other than the center line of the aorta AO. As a result, the output image 229 in which the area considered as the center line of the aorta AO is labeled as a class is obtained.

Figure 32:
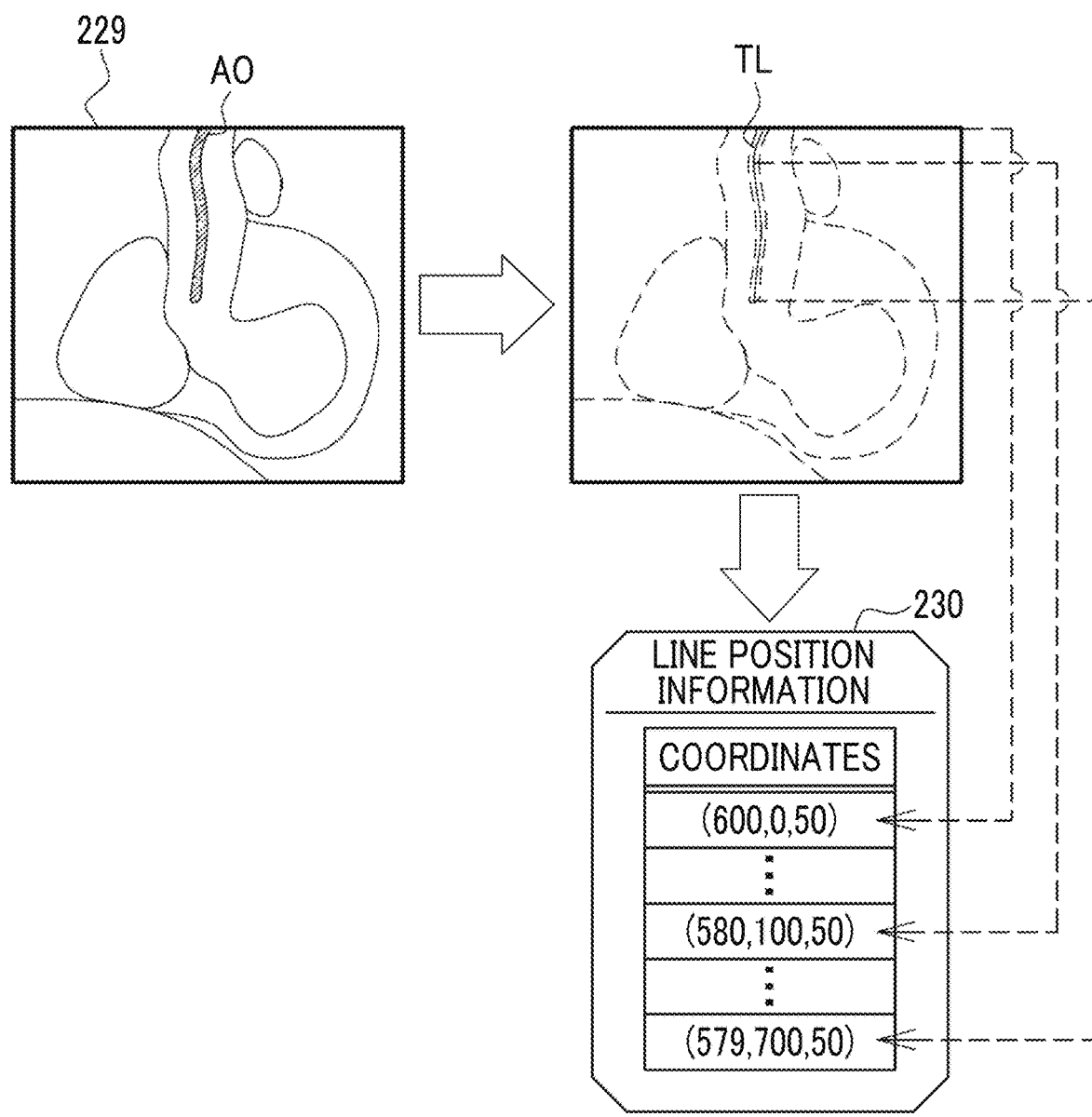
FIG. 32 is a diagram showing a state in which line position information is generated based on an output image.

For example, as shown in FIG. 32, the thinning processing unit 227 performs thinning processing on the area considered as the center line of the aorta AO labeled as the class in the output image 229, and converts the area considered as the center line of the aorta AO into a thin line TL. The thin line TL is configured by a series of one pixel. The thinning processing unit 227 generates line position information 230 in which coordinates of each pixel constituting the thin line TL are registered.

As described above, in the fourth embodiment, the extraction unit 225 generates the output image 229 in which each pixel is labeled with a class corresponding to the presence probability in the probability distribution map 244. Then, the thinning processing is performed on the output image 229, and the center line of the aorta AO is identified based on a result of the thinning processing. Therefore, it is possible to accurately identify a line such as the center line of the aorta AO.

Figure 33:
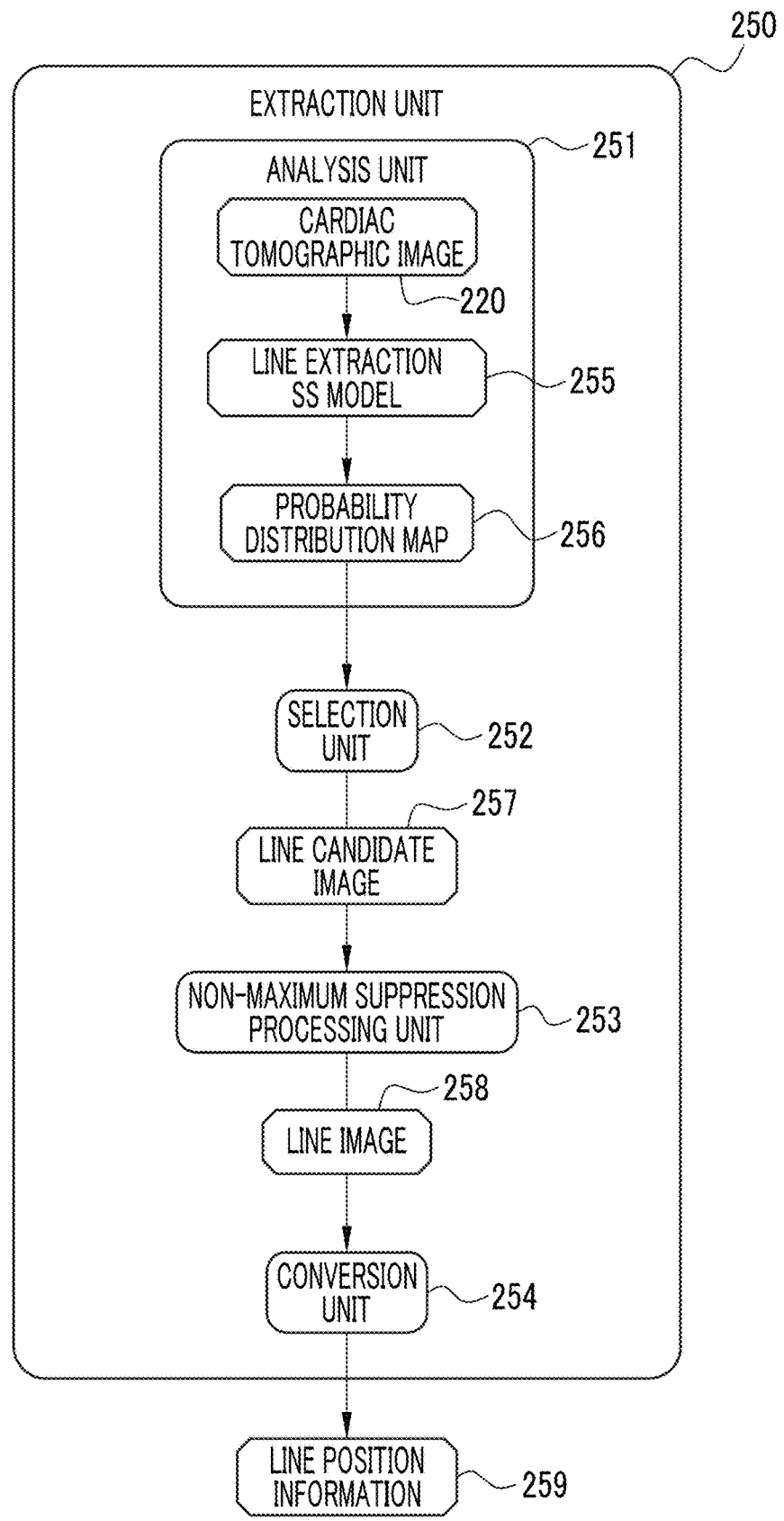
FIG. 33 is a diagram showing another example of the extraction unit according to the fourth embodiment.

For example, the line such as the center line of the aorta AO may be identified using the extraction unit 250 shown in FIG. 33.

In FIG. 33, similarly to the extraction unit 42 according to the first embodiment, the extraction unit 250 includes an analysis unit 251, a selection unit 252, a non-maximum suppression processing unit 253, and a conversion unit 254. The analysis unit 251 inputs the cardiac tomographic image 220 to a line extraction SS model 255, and outputs a probability distribution map 256 indicating the presence probability of the center line of the aorta AO from the line extraction SS model 255. The analysis unit 251 outputs the probability distribution map 256 to the selection unit 252. The probability distribution map 256 is an example of a "feature amount map" according to the technology of the present disclosure. Note that, similarly to the line extraction SS model 228, the line extraction SS model 255 is also trained by assigning a greater weight to a pixel corresponding to the center line of the aorta AO than to the other pixels to calculate a loss.

The selection unit 252 selects an element having the presence probability of the center line of the aorta AO being equal to or greater than the threshold value (for example, 0.9) in the probability distribution map 256 as a candidate 260 (see FIG. 34) for the center line of the aorta AO. The selection unit 252 generates a line candidate image 257 (see also FIG. 34) representing the selected candidate 260, and outputs the generated line candidate image 257 to the non-maximum suppression processing unit 253. The line candidate image 257 is, for example, an image in which a pixel value of a pixel corresponding to the candidate 260 is 1 and pixel values of the other pixels are 0.

The non-maximum suppression processing unit 253 performs non-maximum suppression processing on each candidate 260 of the line candidate image 257, and as a result, generates a line image 258 (see also FIG. 35) representing the center line of the aorta AO. The line image 258 is, for example, an image in which a pixel value of the pixel corresponding to the center line of the aorta AO is 1 and pixel values of the other pixels are 0. That is, the line image 258 is an image in which the center line of the aorta AO is identified.

The non-maximum suppression processing unit 253 outputs the line image 258 to the conversion unit 254. The conversion unit 254 converts the line image 258 into line position information 259.

Figure 34:
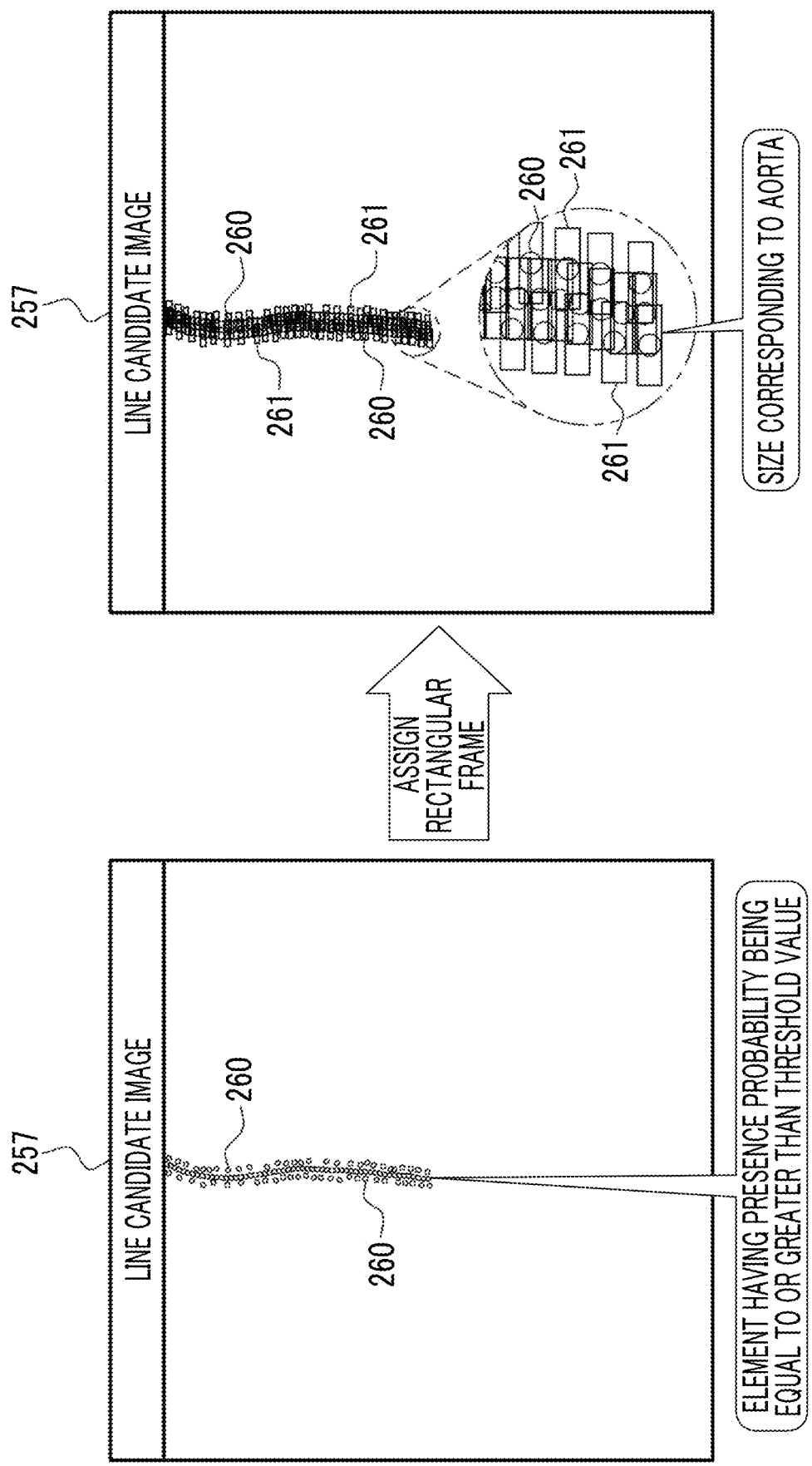
FIG. 34 is a diagram showing non-maximum suppression processing.

FIGS. 34 and 35 show examples of the non-maximum suppression processing by the non-maximum suppression processing unit 253. The line candidate image 257 is obtained by simply selecting, as the candidate 260, an element having the presence probability in the probability distribution map 256 being equal to or greater than the threshold value. For this reason, not all the candidates 260 are truly the center line of the aorta AO. Therefore, by performing the non-maximum suppression processing, the true center line of the aorta AO is narrowed down from a plurality of candidates 260.

As shown in FIG. 34, first, the non-maximum suppression processing unit 253 assigns a rectangular frame 261 to each candidate 260 of the line candidate image 257. The rectangular frame 261 has a preset size corresponding to the aorta AO, for example, a size larger than a width of the aorta AO by one size. The center of the rectangular frame 261 coincides with the candidate 260.

Next, the non-maximum suppression processing unit 253 calculates IoU of the rectangular frame 261 assigned to each candidate 260. As shown in FIG. 35, for two rectangular frames 261 having the IoU equal to or greater than a threshold value (for example, 0.3), the non-maximum suppression processing unit 253 leaves one representative rectangular frame 261 and deletes the other rectangular frame 261 together with the candidate 260. Accordingly, the two rectangular frames 261 in which the IoU is equal to or greater than the threshold value are unified into one rectangular frame 261. By deleting the rectangular frame 261 and the candidate 260 which overlap the adjacent rectangular frame 261 at the IoU equal to or greater than the threshold value in this manner, the line image 258 representing the center line of the aorta AO is finally obtained.

The conversion unit 254 generates the line position information 259 based on the line image 258. The line position information 259 is XYZ coordinates of a plurality of pixels indicating the center line of the aorta AO in the line image 258.

In this way, the selection unit 252 selects, as the candidate 260 for the center line of the aorta AO, an element having a presence probability being equal to or greater than the preset threshold value from among the elements of the probability distribution map 256. The non-maximum suppression processing unit 253 assigns the rectangular frame 261 having the preset size to the selected candidate 260. Then, the non-maximum suppression processing is performed on the rectangular frame 261, and the center line of the aorta AO is identified based on a result of the non-maximum suppression processing. Also by this method, it is possible to accurately identify the line such as the center line of the aorta AO.

The line is not limited to the center line of the aorta AO. The line may be a center line of a rib appearing in the chest tomographic image 190, a center line of a urethra appearing in a waist tomographic image, or the like.

In each of the above-described embodiments, for example, the following various processors can be used as a hardware structure of processing units that execute various pieces of processing, such as the RW control unit 40, the instruction receiving unit 41, the extraction units 42, 165, 195, 210, 225, and 250, the point position display map generation unit 43, the object identification unit 44, the anatomical name assignment unit 45, the display control unit 46, the analysis units 70, 166, 196, 211, 226, and 251, the selection units 71, 212, and 252, the non-maximum suppression processing units 72 and 253, the conversion units 73 and 254, the centroid calculation units 167 and 197, and the thinning processing unit 227. As described above, in addition to the CPU 22 which is a general-purpose processor that executes software (operation program 30) and that functions as various processing units, examples of the various processors include a programmable logic device (PLD) which is a processor of which a circuit configuration can be changed after manufacture, such as a field programmable gate array (FPGA), and a dedicated electric circuit which is a processor having a circuit configuration designed as a dedicated circuit in order to execute specific processing, such as an application specific integrated circuit (ASIC).

One processing unit may be configured by one of these various processors, or may be configured by a combination of two or more processors of the same type or different types (for example, a combination of a plurality of FPGAs and/or a combination of a CPU and an FPGA). In addition, the plurality of processing units may be configured by one processor.

As an example in which the plurality of processing units are configured by one processor, first, as represented by a computer such as a client and a server, there is a form in which one processor is configured by a combination of one or more CPUs and software and this processor functions as the plurality of processing units. Second, as represented by a system on chip (SoC) or the like, there is a form in which a processor that realizes the functions of the entire system including the plurality of processing units with one integrated circuit (IC) chip is used. As described above, the various processing units are configured using one or more of the various processors as the hardware structure.

Further, more specifically, an electric circuit (circuitry) in which circuit elements such as semiconductor elements are combined can be used as the hardware structure of the various processors.

The analysis target image is not limited to the tomographic image 15 or the like obtained from the CT apparatus 10. For example, a tomographic image obtained from a magnetic resonance imaging (MRI) apparatus may be used. Further, the analysis target image is not limited to a three dimensional image such as the tomographic image. For example, a two dimensional image such as a simple radiation image may be used. Furthermore, the analysis target image is not limited to the medical image. For this reason, the object is also not limited to the structure of the body. For example, an image in which a street appears may be used as the analysis target image, and the object may be a human face.

In the technology of the present disclosure, the above-described various embodiments and/or various modification examples can be appropriately combined. Further, it is needless to say that the present disclosure is not limited to each of the above-described embodiments and various configurations can be adopted without departing from the scope of the technology of the present disclosure. Furthermore, the technology of the present disclosure extends to a storage medium that non-transitorily stores a program in addition to the program.

The contents described and shown above are detailed descriptions of portions according to the technology of the present disclosure and are merely examples of the technology of the present disclosure. For example, the above description of the configurations, functions, actions, and effects is description of an example of the configurations, functions, actions, and effects of the portions according to the technology of the present disclosure. Accordingly, it goes without saying that unnecessary portions may be deleted, new elements may be added, or replacement may be made with respect to the contents described and shown above without departing from the scope of the technology of the present disclosure. In addition, in order to avoid complication and facilitate understanding of portions according to the technology of the present disclosure, description related to common technical knowledge or the like that does not need to be particularly described for enabling implementation of the technology of the present disclosure is omitted in the contents described and shown above.

In the present specification, "A and/or B" has the same meaning as "at least one of A or B". That is, "A and/or B" means that only A may be used, only B may be used, or a combination of A and B may be used. In addition, in the present specification, in a case where three or more matters are expressed by being connected by "and/or", the same concept as "A and/or B" is applied.

All documents, patent applications, and technical standards described in the present specification are incorporated in the present specification by reference to the same extent as a case where each individual publication, patent application, or technical standard is specifically and individually indicated to be incorporated by reference.

What is claimed is:

1. An image processing apparatus comprising:
a processor; and
a memory connected to or built in the processor,
wherein the processor
uses a semantic segmentation model that has been trained using an annotation image in which a first pixel corresponding to at least any one of one point corresponding to an object, a plurality of discrete points corresponding to a plurality of objects, or a line corresponding to an object having a line structure is set as a first pixel value and a second pixel other than the first pixel is set as a second pixel value different from the first pixel value, the semantic segmentation model having been trained by assigning a greater weight to the first pixel than to the second pixel to calculate a loss,
inputs an analysis target image to the semantic segmentation model and outputs a feature amount map having a feature amount related to at least any one of the one point, the plurality of discrete points, or the line in the analysis target image from the semantic segmentation model, and
identifies at least any one of the one point, the plurality of discrete points, or the line in the analysis target image based on the feature amount map,
wherein the processor identifies a centroid of an aortic valve corresponding to the one point of the feature amount map based on the feature amount.

2. The image processing apparatus according to claim 1, wherein the feature amount map is a probability distribution map having a presence probability of the plurality of discrete points as the feature amount, and
the processor
generates an output image in which each pixel is labeled with a class corresponding to the presence probability in the probability distribution map, and
identifies the plurality of discrete points based on the output image.

3. The image processing apparatus according to claim 1, wherein the feature amount map is a probability distribution map having a presence probability of the plurality of discrete points as the feature amount, and
the processor
selects an element having the presence probability equal to or greater than a preset threshold value from among elements of the probability distribution map as a candidate for the plurality of discrete points,
assigns a rectangular frame having a preset size to the selected candidate,
performs non-maximum suppression processing on the rectangular frame, and
identifies the plurality of discrete points based on a result of the non-maximum suppression processing.

4. The image processing apparatus according to claim 1, wherein the feature amount map is a probability distribution map having a presence probability of the line as the feature amount, and
the processor
generates an output image in which each pixel is labeled with a class corresponding to the presence probability in the probability distribution map,
performs thinning processing on the output image, and
identifies the line based on a result of the thinning processing.

5. The image processing apparatus according to claim 1, wherein the feature amount map is a probability distribution map having a presence probability of the line as the feature amount, and
the processor
selects an element having the presence probability equal to or greater than a preset threshold value from among elements of the probability distribution map as a candidate for the line,
assigns a rectangular frame having a preset size to the selected candidate,
performs non-maximum suppression processing on the rectangular frame, and
identifies the line based on a result of the non-maximum suppression processing.

6. The image processing apparatus according to claim 1, wherein the analysis target image is a medical image in which an inside of a body of a patient appears, and the object is a structure of the body.

7. An operation method of an image processing apparatus, the method comprising:
using a semantic segmentation model that has been trained using an annotation image in which a first pixel corresponding to at least any one of one point corresponding to an object, a plurality of discrete points corresponding to a plurality of objects, or a line corresponding to an object having a line structure is set as a first pixel value and a second pixel other than the first pixel is set as a second pixel value different from the first pixel value, the semantic segmentation model having been trained by assigning a greater weight to the first pixel than to the second pixel to calculate a loss;
inputting an analysis target image to the semantic segmentation model and outputting a feature amount map having a feature amount related to at least any one of the one point, the plurality of discrete points, or the line in the analysis target image from the semantic segmentation model;
identifying at least any one of the one point, the plurality of discrete points, or the line in the analysis target image based on the feature amount map; and
identifying a centroid of an aortic valve corresponding to the one point of the feature amount map based on the feature amount.

8. A non-transitory computer-readable storage medium storing an operation program of an image processing apparatus, the program causing a computer to execute a process comprising:
using a semantic segmentation model that has been trained using an annotation image in which a first pixel corresponding to at least any one of one point corresponding to an object, a plurality of discrete points corresponding to a plurality of objects, or a line corresponding to an object having a line structure is set as a first pixel value and a second pixel other than the first pixel is set as a second pixel value different from the first pixel value, the semantic segmentation model having been trained by assigning a greater weight to the first pixel than to the second pixel to calculate a loss;
inputting an analysis target image to the semantic segmentation model and outputting a feature amount map having a feature amount related to at least any one of the one point, the plurality of discrete points, or the line in the analysis target image from the semantic segmentation model; and
identifying at least any one of the one point, the plurality of discrete points, or the line in the analysis target image based on the feature amount map; and
identifying a centroid of an aortic valve corresponding to the one point of the feature amount map based on the feature amount.

\* \* \* \* \*